US011213763B2

(12) United States Patent
Hayashi

(10) Patent No.: US 11,213,763 B2
(45) Date of Patent: Jan. 4, 2022

(54) AUTONOMOUSLY ACTING ROBOT

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 194 days.

(21) Appl. No.: 16/233,097

(22) Filed: Dec. 27, 2018

(65) Prior Publication Data

US 2019/0126157 A1 May 2, 2019

Related U.S. Application Data

(63) Continuation of application No. PCT/JP2017/022674, filed on Jun. 20, 2017.

(30) Foreign Application Priority Data

Jul. 11, 2016 (JP) .............................. JP2016-136647

(51) Int. Cl.
*A63H 11/00* (2006.01)
*A63H 11/12* (2006.01)
(Continued)

(52) U.S. Cl.
CPC ............... *A63H 11/00* (2013.01); *A63H 3/28* (2013.01); *A63H 11/12* (2013.01); *B25J 5/007* (2013.01);
(Continued)

(58) Field of Classification Search
CPC ........ A63H 11/00; A63H 11/12; A63H 13/00; A63H 17/00; A63H 17/004; B25J 9/003; B25J 9/163; B25J 9/1694; B25J 13/087
See application file for complete search history.

(56) References Cited

U.S. PATENT DOCUMENTS 3,693,292 A * 9/1972 Di Leva ................. A63H 13/12
446/158
5,535,843 A * 7/1996 Takeda ..................... B25J 5/007
180/200

(Continued)

FOREIGN PATENT DOCUMENTS

CN 1127402 C 11/2003
CN 1697723 A 11/2005
(Continued)

OTHER PUBLICATIONS

Office Action in CN Application No. 201780042199.6, dated Apr. 10, 2020. 13pp.

(Continued)

*Primary Examiner* — Eugene L Kim
*Assistant Examiner* — Alyssa M Hylinski
(74) *Attorney, Agent, or Firm* — Hauptman Ham, LLP

(57) ABSTRACT

A robot includes a body, a wheel having a ground contacting surface when moving, and a wheel drive mechanism that drives the wheel so as to advance from a housing space provided in the body to an exterior and withdraw. The wheel drive mechanism causes the wheel to withdraw to the housing space in a non-ground contacting state when a housing condition is satisfied. The body has a ground contacting bottom face that comes into contact with the ground when the wheel is housed in the housing space in a non-ground contacting state.

17 Claims, 12 Drawing Sheets

(51) Int. Cl.
*A63H 3/28* (2006.01)
*B25J 5/00* (2006.01)
*B25J 9/00* (2006.01)
*B25J 9/16* (2006.01)
*B25J 13/08* (2006.01)

(52) U.S. Cl.
CPC ............. *B25J 9/0003* (2013.01); *B25J 9/163* (2013.01); *B25J 9/1694* (2013.01); *B25J 13/087* (2013.01); *A63H 2200/00* (2013.01)

(56) References Cited

U.S. PATENT DOCUMENTS

| | | | | |
|---|---|---|---|---|
| 5,916,008 | A * | 6/1999 | Wong | A63H 17/004 446/445 |
| 6,374,157 | B1 | 4/2002 | Takamura | |
| 6,458,011 | B1 | 10/2002 | Inoue et al. | |
| 6,565,371 | B1 * | 5/2003 | Watanabe | H01R 13/4536 439/138 |
| 7,402,974 | B2 * | 7/2008 | Jeon | B60L 15/20 318/567 |
| 8,554,370 | B2 * | 10/2013 | Goswami | B62D 57/032 700/253 |
| 9,429,948 | B2 * | 8/2016 | Gouaillier | G05D 1/021 |
| 9,573,070 | B2 * | 2/2017 | Morley | G01L 1/205 |
| 2005/0108660 | A1 * | 5/2005 | Cheng | A61B 5/103 715/863 |
| 2005/0215171 | A1 * | 9/2005 | Oonaka | A61B 5/01 446/301 |
| 2005/0228540 | A1 * | 10/2005 | Moridaira | A63H 11/00 700/245 |
| 2007/0192910 | A1 | 8/2007 | Vu et al. | |
| 2012/0245735 | A1 * | 9/2012 | Lee | B62D 57/032 700/255 |
| 2012/0328395 | A1 * | 12/2012 | Jacobsen | B25J 13/025 414/1 |
| 2013/0231822 | A1 * | 9/2013 | Gouaillier | B62D 57/032 701/23 |
| 2014/0249676 | A1 * | 9/2014 | Florencio | G06N 3/008 700/259 |
| 2015/0185733 | A1 * | 7/2015 | Jagenstedt | B60L 8/003 701/25 |
| 2015/0336276 | A1 | 11/2015 | Song et al. | |
| 2016/0007817 | A1 * | 1/2016 | Schlischka | A47L 11/4066 280/5.514 |
| 2016/0077527 | A1 * | 3/2016 | Hutson | G05D 1/0246 701/28 |
| 2016/0171303 | A1 * | 6/2016 | Moore | G06T 7/70 382/153 |
| 2016/0362147 | A1 * | 12/2016 | Mailey | B62D 55/075 |
| 2017/0251633 | A1 * | 9/2017 | Womble | A01K 15/025 |

FOREIGN PATENT DOCUMENTS

| | | |
|---|---|---|
| CN | 201940040 U | 8/2011 |
| CN | 103010326 A | 4/2013 |
| DE | 60036599 T2 | 2/2008 |
| EP | 1155787 A1 | 11/2001 |
| EP | 1941411 B1 | 9/2011 |
| JP | 2000-323219 A | 11/2000 |
| JP | 2001-138273 A | 5/2001 |
| JP | 2003-311028 A | 11/2003 |
| JP | 200434169 A | 2/2004 |
| JP | 2004-306251 A | 11/2004 |
| JP | 2005-144612 A | 6/2005 |
| JP | 2011-681 A | 1/2011 |

OTHER PUBLICATIONS

Office Action in DE Application No. 112017003480.9, dated Jun. 4, 2020. 12pp.
Office Action in CN Application No. 201780042199.6, dated Sep. 21, 2020. 12pp.
Written Opinion of the ISA in PCT/JP2017/022674, dated Sep. 26, 2017, 10pp.
Examination Report in GB Application No. 1820152.5, dated Mar. 30, 2021. 4pp.
International Search Report in PCT/JP2017/022674, dated Sep. 26, 2017. 4pp.
Yuichiro Kurose, "Yuatsu Power Unit Tosaigata Kyakusharin Robot RL-WI no Kaihatsu", the 34th Annual Conference of the Robotics Society of Japan Yokoshu DVD-ROM 2016 Nen, Sep. 7, 2016, pp. 1423 to 1424. 4pp.
Office Action in JP Application No. 2017-564923, dated Mar. 27, 2018. 8pp.
Office Action in JP Application No. 2017-564923, dated Jul. 31, 2018. 6pp.

* cited by examiner

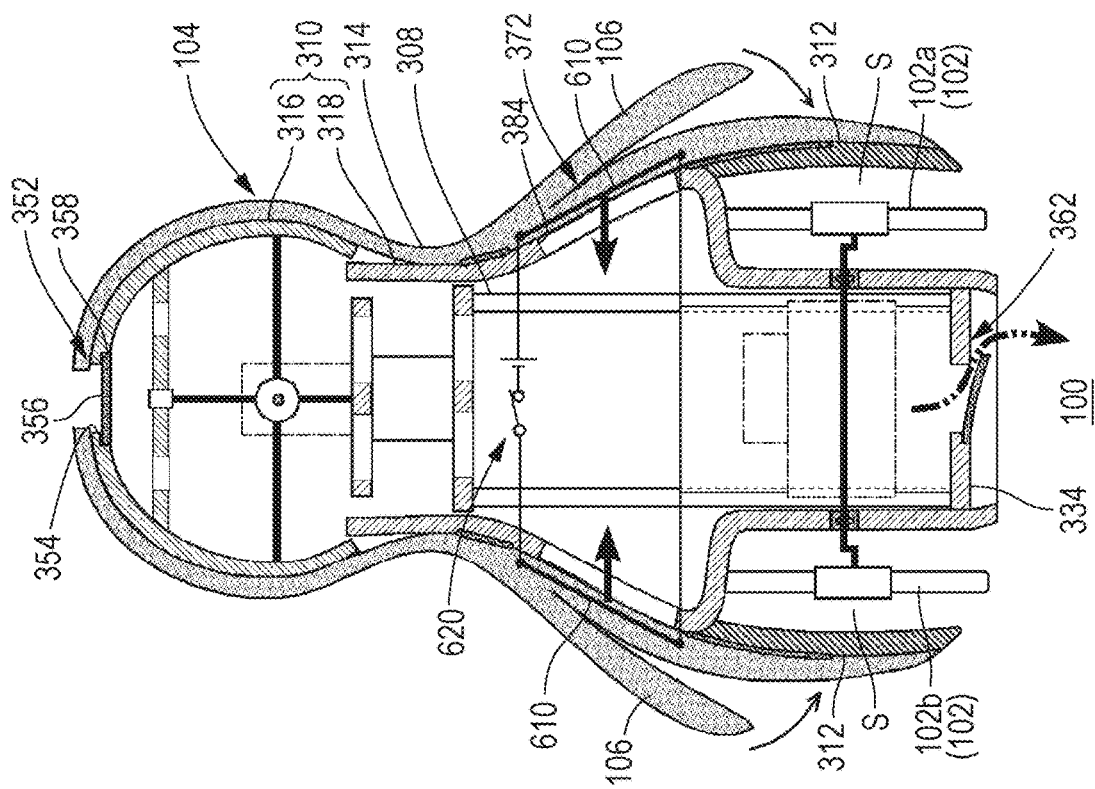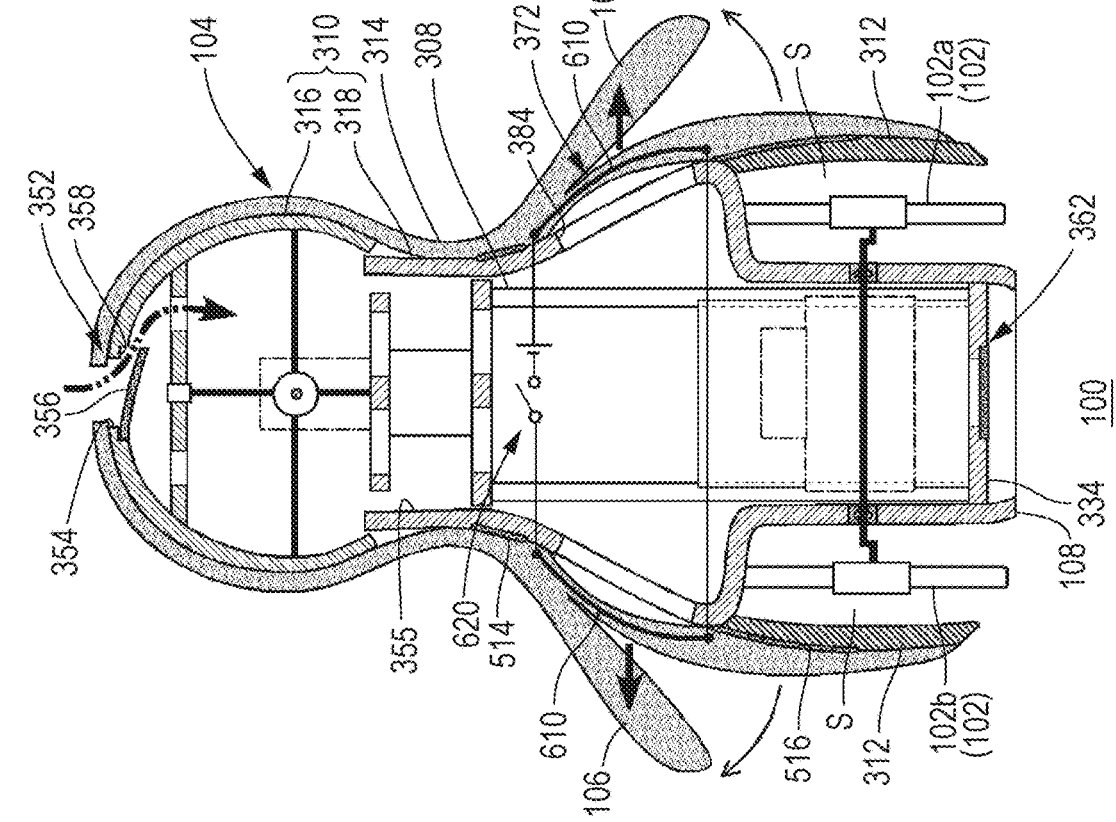

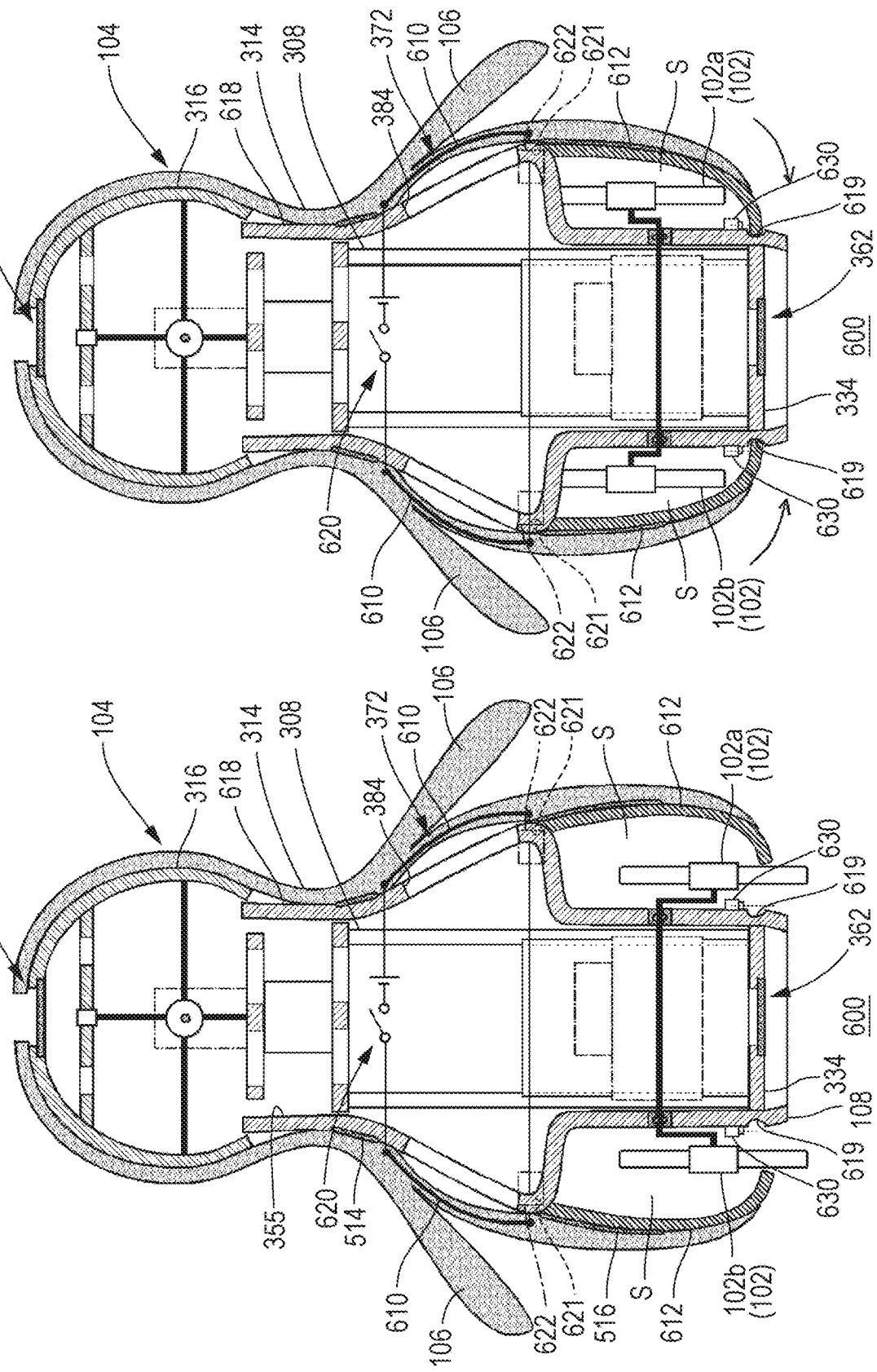

AUTONOMOUSLY ACTING ROBOT

RELATED APPLICATIONS

The present application is a continuation of International Application No. PCT/JP2017/022674, filed Jun. 20, 2017, which claims priority from Japanese Application No. 2016-136647, filed Jul. 11, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

Development of an autonomously acting robot that provides conversation and solace fora human, such as a humanoid robot or a pet robot, is being carried out (for example, refer to Patent Document 1). This kind of robot acts in accordance with a control program, but evolves behavior by autonomously learning based on a peripheral situation, and becomes an existence that is close to a living being.

CITATION LIST

Patent Literature

Patent Document 1: JP-A-2000-323219

SUMMARY OF INVENTION

Technical Problem

This kind of robot technology is progressing rapidly in recent years, but has not yet realized a presence that acts as a companion like a pet. However high a performance a robot may have, the robot will not have the flesh and blood warmth of a living creature. This is because structural design is carried out, and control is carried out, based on this kind of fixed idea.

The invention, having been completed based on a recognition of the heretofore described problem, has a main object of providing a structure and control technology that can reduce a feeling of distance from a robot.

Solution to Problem

An autonomously acting robot in an aspect of the invention includes a body, a movement mechanism having aground contacting surface when moving, and a drive mechanism that causes the movement mechanism to withdraw to a housing space provided in the body when a housing condition is satisfied.

An autonomously acting robot in another aspect of the invention includes a body, a lifting and hugging determination unit that determines that the robot has been lifted and hugged, and a drive mechanism that drives so as to cause a posture of the body to change when it is determined that the robot has been lifted and hugged and a predetermined drive condition is satisfied.

Advantageous Effects of Invention

According to the invention, a feeling of distance from a robot can be reduced.

BRIEF DESCRIPTION OF DRAWINGS

FIG. 5A and FIG. 5B are drawings schematically showing an expansion and contraction operation.

FIG. 12A and FIG. 12B are drawings representing a configuration and an operation of a robot according to a third embodiment.

DESCRIPTION OF EMBODIMENTS

Figure 1A:
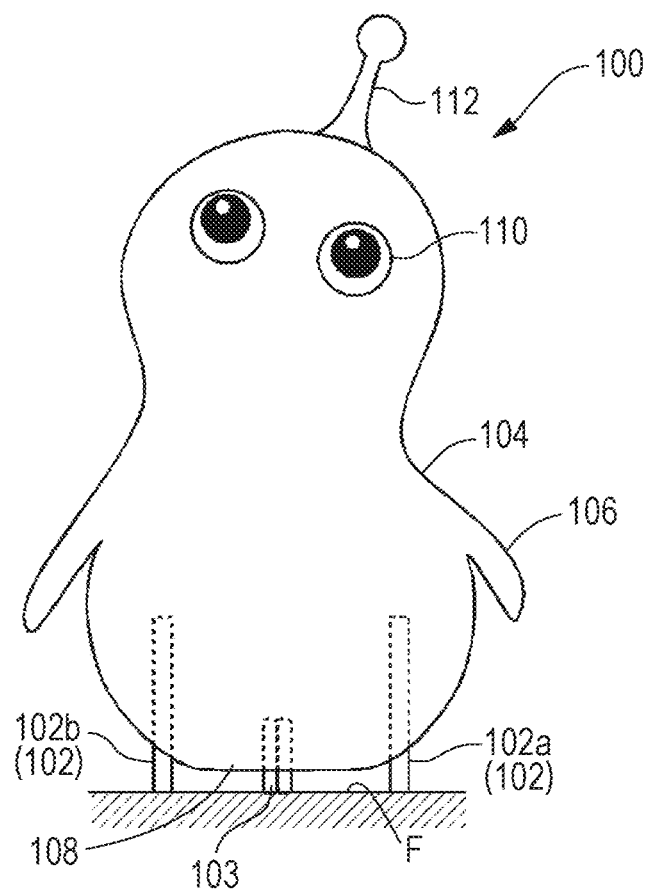
FIG. 1A and FIG. 1B are drawings representing external views of a robot according to a first embodiment.

Hereafter, embodiments of the invention will be described in detail, with reference to the drawings. In the following description, for the sake of convenience, a positional relationship of structures may be expressed with a state shown in the drawings as a reference. Also, in the following embodiments and modified examples thereof, the same reference signs are allotted to components that are practically identical, and a description thereof may be omitted as appropriate.

First Embodiment

Figure 1B:
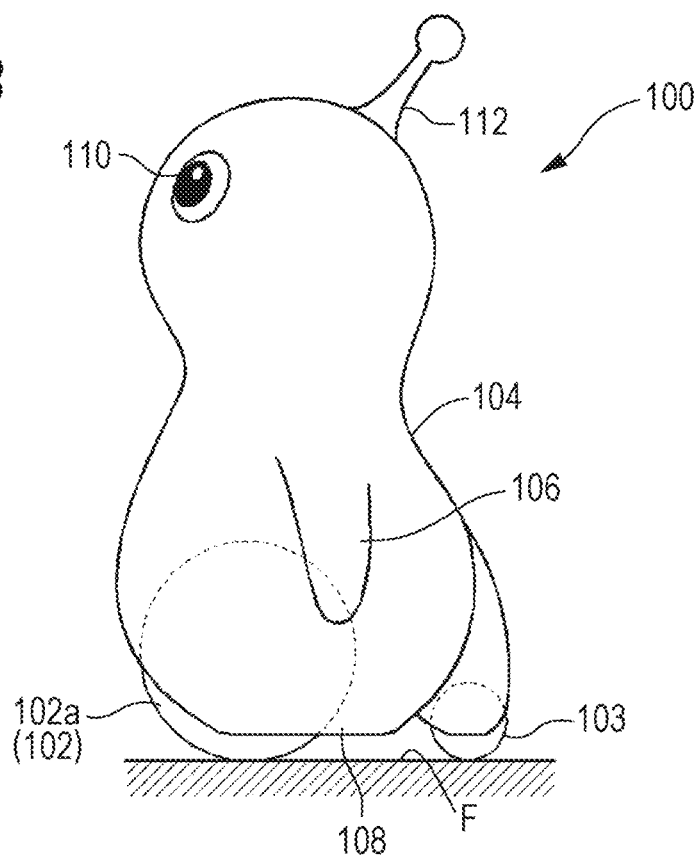

FIG. 1A and FIG. 1B are drawings representing external views of a robot 100 according to a first embodiment. FIG. 1A is a front view, and FIG. 1B is a side view.

The robot 100 in this embodiment is an autonomously acting robot that determines an action or a gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102*a* and a right wheel 102*b*) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102*b* is greater than that of the left wheel 102*a*, the robot 100 can turn left or rotate counterclockwise. By controlling so that the rotational speed of the left wheel 102*a* is greater than that of the right wheel 102*b*, the robot 100 can turn right or rotate clockwise.

The front wheels 102 and the rear wheel 103 can be completely housed in the body 104 using a drive mechanism (a pivoting mechanism and a linking mechanism) to be described hereafter. A greater portion of each wheel is hidden by the body 104 when traveling too, but when each wheel is completely housed in the body 104, the robot 100 is in a state of being unable to move. That is, the body 104 descends, and sits on a floor surface, in accompaniment to an operation of the wheels being housed. In the sitting state, a flat seating face 108 (a ground contacting bottom face) formed in a bottom portion of the body 104 comes into contact with the floor surface F.

The robot 100 has a pair of arms 106. The arms 106 do not have a function of gripping an object, but are slightly displaced up and down and left and right in accompaniment to an expanding or contracting transformation of a trunk portion, to be described hereafter. In a modified example, the two arms 106 can also be individually controlled, and may be capable of performing simple actions such as raising, waving, and oscillating.

A camera is incorporated in an eye 110. The eye 110 is also capable of an image display using a liquid crystal element or an organic EL element. In addition to the camera incorporated in the eye 110, various sensors, such as a highly directional microphone and an ultrasonic sensor, are mounted in the robot 100. Also, a speaker is incorporated, and the robot 100 is also capable of simple speech. A horn 112 is attached to a head portion of the robot 100. As the robot 100 is lightweight, as heretofore described, a user can also lift up the robot 100 by grasping the horn 112.

Figure 2:
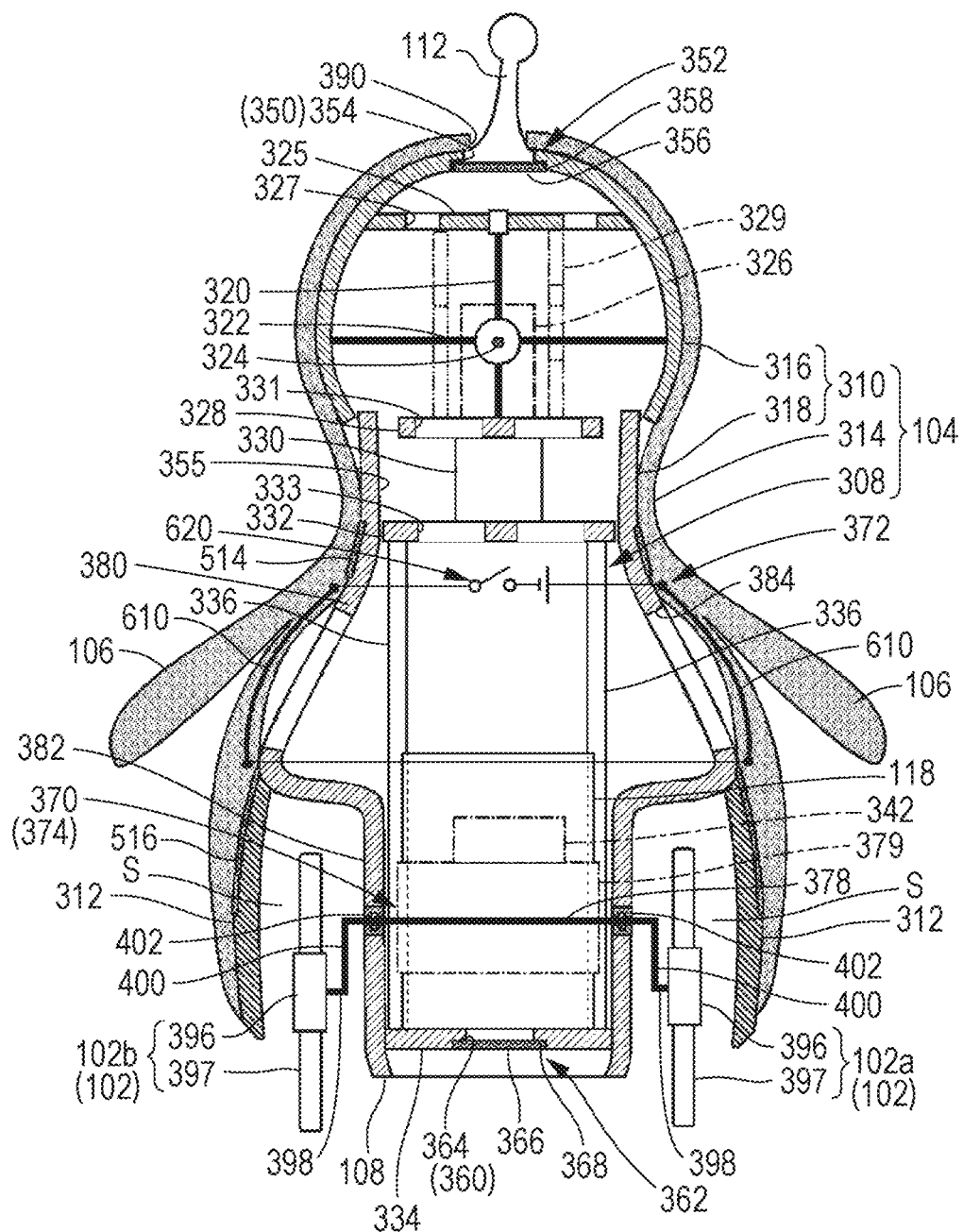
FIG. 2 is a sectional view schematically representing a structure of the robot.
Figure 3:
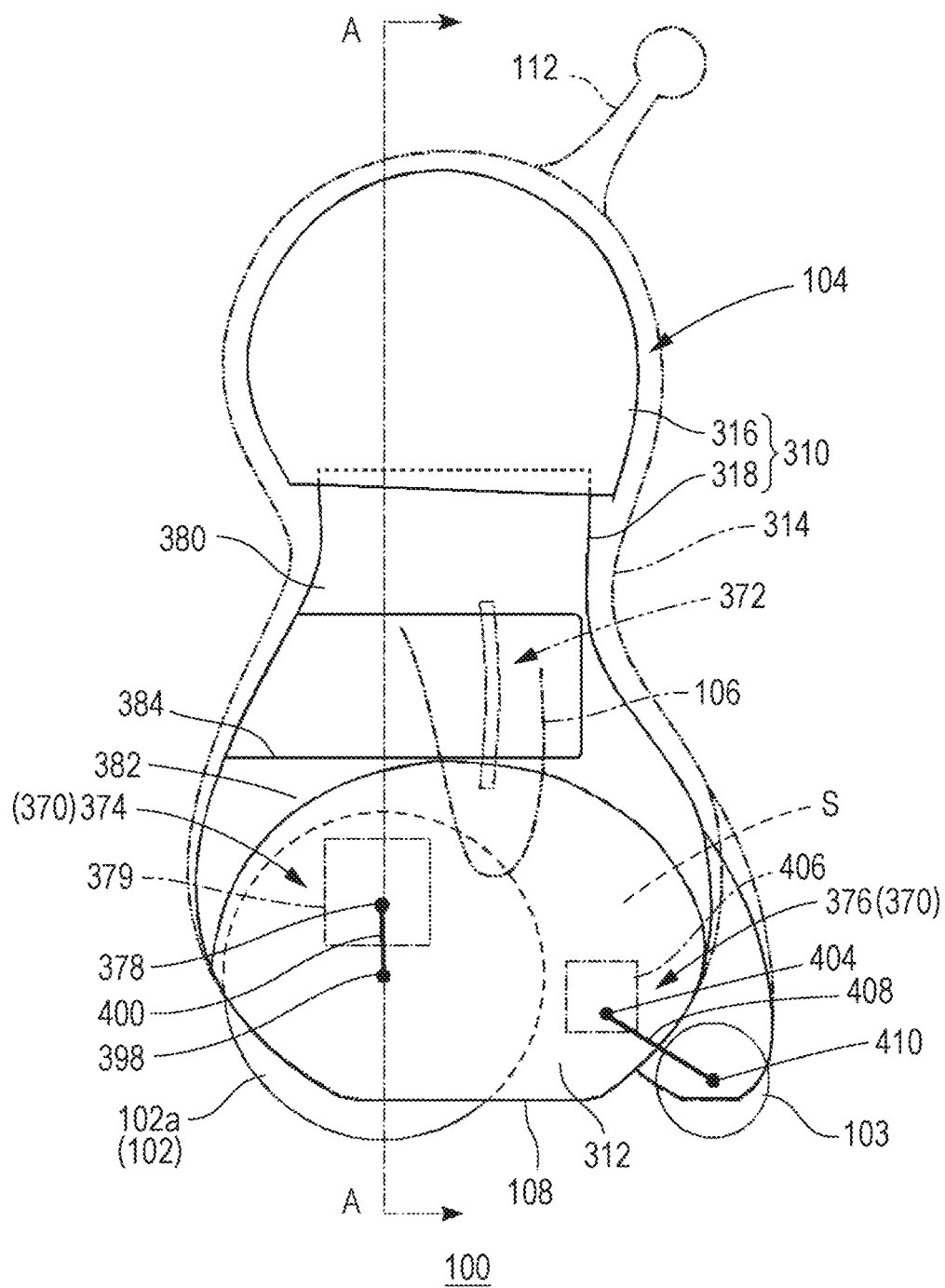
FIG. 3 is a side view representing the structure of the robot centered on a frame.

FIG. 2 is a sectional view schematically representing a structure of the robot 100. FIG. 3 is a side view representing the structure of the robot 100 centered on a frame. FIG. 2 corresponds to a section seen along an A-A arrow of FIG. 3.

As shown in FIG. 2, the body 104 of the robot 100 includes a base frame 308, a main body frame 310, a pair of wheel covers 312, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control device 342, and various kinds of actuator and the like are housed inside the base frame 308.

A stepped hole 360 is provided in a center of the lower plate 334, and an exhaust valve 362 is disposed therein. That is, an upper small diameter portion of the stepped hole 360 forms an exhaust port 364, and a valve body 366 formed of a rubber sheet is disposed in a lower large diameter portion. A valve seat 368 is formed in an interface between the small diameter portion and the large diameter portion. One radial direction side of the valve body 366 is bonded to the large diameter portion to form a fixed end, and an opposite radial direction side forms a free end. The exhaust valve 362 is opened and closed by the valve body 366 coming into contact with and separating from the valve seat 368. The exhaust valve 362 is a check valve that opens only when discharging air inside the main body frame 310 to an exterior.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325. A stepped hole 350 is provided in a center of an upper end portion of the head portion frame 316, and an intake valve 352 is disposed therein. That is, an upper small diameter portion of the stepped hole 350 forms an intake port 354, and a valve body 356 formed of a rubber sheet is disposed in a lower large diameter portion. A valve seat 358 is formed in an interface between the small diameter portion and the large diameter portion. One radial direction side of the valve body 356 is bonded to the large diameter portion to form a fixed end, and an opposite radial direction side forms a free end. The intake valve 352 is opened and closed by the valve body 356 coming into contact with and separating from the valve seat 358. The intake valve 352 is a check valve that opens only when introducing external air into the main body frame 310.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308, a wheel drive mechanism 370, and an expansion and contraction drive mechanism 372. As shown in FIG. 3, the wheel drive mechanism 370 includes a front wheel drive mechanism 374 and a rear wheel drive mechanism 376. An upper half portion 380 of the trunk portion frame 318 is of a smooth curved form so as to provide an outline of the body 104 with roundness. The upper half portion 380 is formed so as to become gradually narrower toward an upper portion corresponding to a neck portion. A lower half portion 382 of the trunk portion frame 318 is of a small width in order to form a housing space S of the front wheel 102 between the wheel covers 312. A boundary of the upper half portion 380 and the lower half portion 382 is of a stepped form.

Left and right side walls configuring the lower half portion 382 are parallel to each other, are penetrated by a pivot shaft 378, to be described hereafter, of the front wheel drive mechanism 374, and support the pivot shaft 378. A slit form aperture portion 384 opened frontward from a side portion is formed in the upper half portion 380. Air can be introduced to an inner surface of the outer skin 314 via the aperture portion 384. The lower plate 334 is provided so as to as to close off a lower end aperture portion of the lower half portion 382. In other words, the base frame 308 is fixed to and supported by a lower end portion of the trunk portion frame 318.

The pair of wheel covers 312 are provided so as to cover the lower half portion 382 of the trunk portion frame 318 from left and right. The wheel cover 312 is formed of resin, and is attached so as to form a smooth outer face (curved face) continuous with the upper half portion 380 of the trunk portion frame 318. An upper end portion of the wheel cover 312 is linked along a lower end portion of the upper half portion 380. Because of this, the housing space S, which is opened downward, is formed between the side wall of the lower half portion 382 and the wheel cover 312.

The outer skin 314 is formed of urethane rubber, and is mounted so as to cover the main body frame 310 and the wheel covers 312 from an outer side. Although urethane rubber is employed in this embodiment, another elastic body, such as rubber, may be employed in a modified example. The outer skin 314 functions as "an expanding and contracting body". The arms 106 are molded integrally with the outer skin 314.

An aperture portion 390 is provided in a position corresponding to the intake port 354 in an upper end portion of the outer skin 314. Because of this, external air passing through the intake valve 352 can be introduced. The outer skin 314 is generally in close contact with an outer face of the main body frame 310 and the wheel cover 312, but a sealing structure for ensuring airtightness inside the main body frame 310 is provided. That is, an adhesive layer 514 is provided around a whole circumference between an upper portion of the trunk portion frame 318 and the outer skin 314. Also, an adhesive layer 516 is also provided around a whole circumference between the wheel cover 312 and the outer skin 314. According to this kind of configuration, a sealing property of an expanding and contracting portion of the outer skin 314 is secured.

According to this kind of configuration, a communication channel 355 that causes the intake port 354 and the exhaust port 364 to communicate is formed inside the main body frame 310. When both the intake port 354 and the exhaust port 364 are closed, the inside of the communication channel 355 becomes a sealed space. Heat generating parts such as the battery 118, the control device 342, and the actuators are disposed inside the communication channel 355. Also, the heat generating parts are preferably disposed so as to impede a flow of air flowing through the communication channel 355 as little as possible. A multiple of ventilation holes 331 are formed in the base plate 328 in order to improve ventilation of the communication channel 355. Also, a multiple of ventilation holes 333 are formed in the upper plate 332.

The front wheel drive mechanism 374 includes a wheel drive mechanism for causing the front wheel 102 to rotate and a housing operation mechanism for causing the front wheel 102 to enter and withdraw from the housing space S. That is, the front wheel drive mechanism 374 includes the pivot shaft 378 and an actuator 379. The front wheel 102 has a direct drive motor (hereafter written as a "DD motor") 396 in a central portion thereof. The DD motor 396 has an outer rotor structure, a stator is fixed to an axle 398, and a rotor is fixed coaxially to a rim 397 of the front wheel 102. The axle 398 is integrated with the pivot shaft 378 via an arm 400. A bearing 402 through which the pivot shaft 378 penetrates and which supports the pivot shaft 378 so as to be able to pivot is embedded in a lower portion side wall of the trunk portion frame 318. A sealing structure (bearing seal) for hermetically sealing the trunk portion frame 318 inside and outside is provided in the bearing 402. The front wheel 102 can be driven to reciprocate between the housing space S and the exterior by a drive of the actuator 379.

The rear wheel drive mechanism 376 includes a pivot shaft 404 and an actuator 406. Two arms 408 extend from the pivot shaft 404, and an axle 410 is provided integrally with leading ends of the arms 408. The rear wheel 103 is supported so as to be able to rotate by the axle 410. A bearing omitted from the drawings, through which the pivot shaft 404 penetrates and which supports the pivot shaft 404 so as to be able to pivot, is embedded in the lower portion side wall of the trunk portion frame 318. A shaft sealing structure is also provided in the bearing. The rear wheel 103 can be driven to reciprocate between the housing space S and the exterior by a drive of the actuator 406.

The expansion and contraction drive mechanism 372 includes a shape memory alloy line 610 embedded in the outer skin 314, and a drive circuit 620 (energizing circuit) of the shape memory alloy line 610. The shape memory alloy line 610 is formed as a wire line member that contracts and hardens when heated, and relaxes and lengthens when allowed to cool. Leads drawn out from both ends of the shape memory alloy line 610 are connected to the drive circuit 620. When a switch of the drive circuit 620 is activated, the shape memory alloy line 610 is energized.

The shape memory alloy line 610 is molded or woven into the outer skin 314 in a position at a height corresponding to the aperture portion 384. Leads are drawn from both ends of the shape memory alloy line 610 into the trunk portion frame 318. One shape memory alloy line 610 may be provided in each of a left and right of the outer skin 314, or a multiple of the shape memory alloy line 610 may be provided in parallel in each of the left and right of the outer skin 314.

When no load is exerted on the outer skin 314, the outer skin 314 is of an expanded form owing to the elasticity thereof, as shown in the drawings. The shape memory alloy line 610 is in a state of being relaxed and lengthened in a curved form along the outer skin 314. When the drive circuit 620 is turned on, the shape memory alloy line 610 takes on a state of being contracted and hardened in a linear form (refer to FIG. 5B).

Next, a wheel housing operation and an expanding and contracting operation of the robot 100 will be described.

Figure 4A:
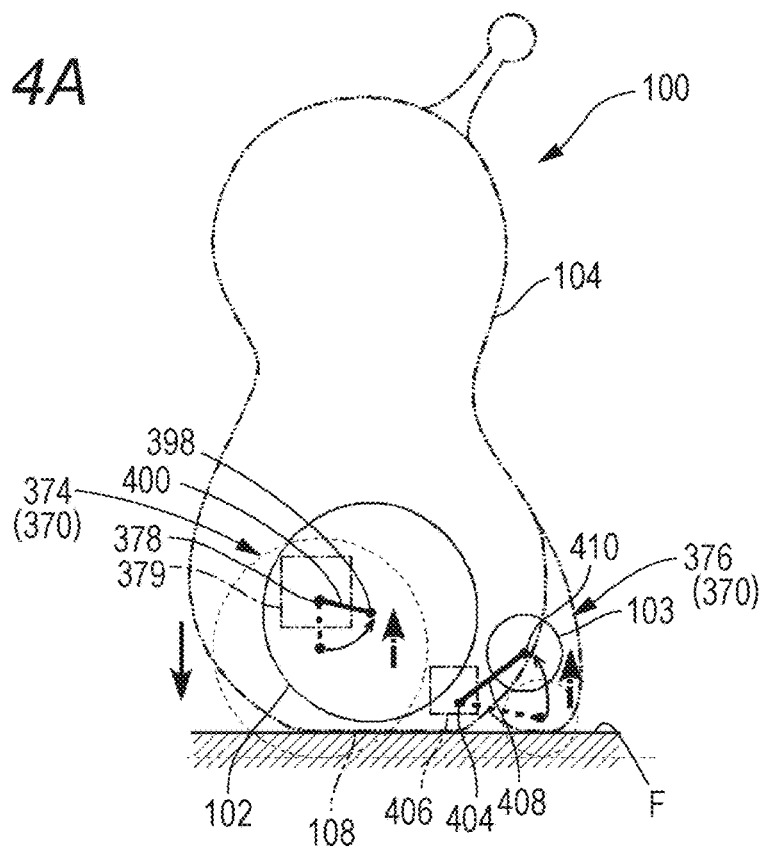
FIG. 4A and FIG. 4B are drawings schematically showing a wheel housing operation.
Figure 4B:
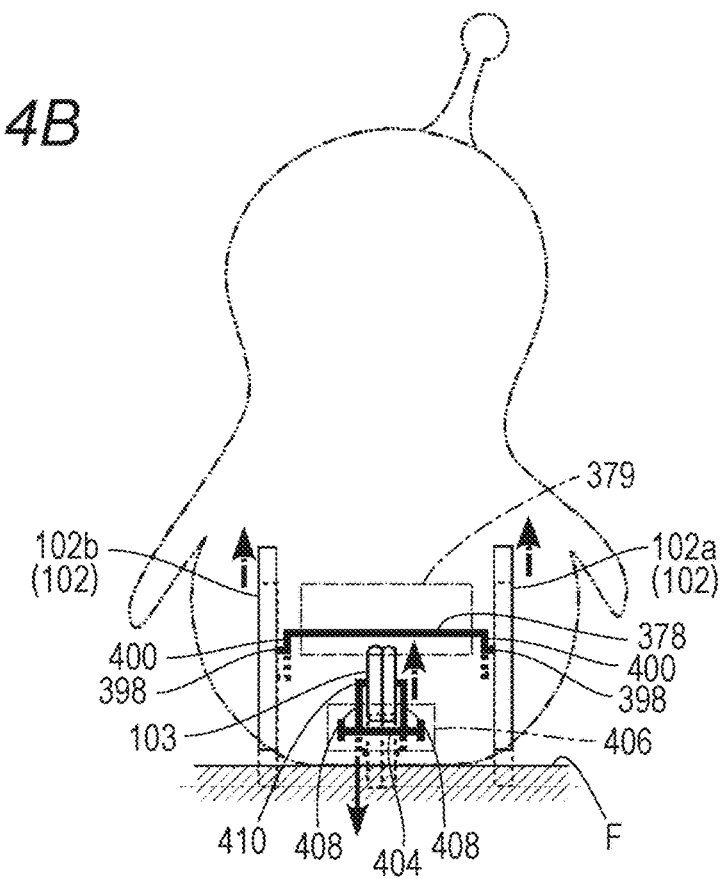

FIG. 4A and FIG. 4B are drawings schematically showing the wheel housing operation. FIG. 4A is a side view, and FIG. 4B is a front view. Dotted lines in the drawing indicate a state wherein the wheels have advanced out of the housing space S and can run, and solid lines in the drawing indicate a state wherein the wheels are housed in the housing space S.

When housing the wheels, the actuators 379 and 406 are driven in one direction. At this time, the arm 400 pivots centered on the pivot shaft 378, and the front wheel 102 rises from the floor surface F. Also, the arm 408 pivots centered on the pivot shaft 404, and the rear wheel 103 rises from the floor surface F (refer to a dashed-dotted arrow). Because of this, the body 104 descends, and the seating face 108 comes into contact with the floor surface F (refer to a solid arrow). Because of this, a state in which the robot 100 is sitting is realized. By the actuators 379 and 406 being driven in the opposite direction, each wheel is caused to advance out of the housing space S, whereby the robot 100 can be caused to stand.

FIG. 5A and FIG. 5B are drawings schematically showing the expansion and contraction operation. FIG. 5A shows an expanded state, and FIG. 5B shows a contracted state.

When the switch of the drive circuit 620 is changed from an on-state to an off-state, the shape memory alloy line 610 relaxes and lengthens, as shown in FIG. 5A (refer to a solid arrow). Because of this, the outer skin 314 expands to an original state, and internal pressure of the main body frame 310 becomes negative. As a result of this, the intake valve 352 opens, and external air is introduced into the interior of the body 104 (refer to a two-dot chain line arrow). At this time, the exhaust valve 362 maintains a closed state. As an outward appearance, the trunk portion of the robot 100 expands, and the arm 106 is in a slightly pushed-up state.

When the switch of the drive circuit 620 is changed from an off-state to an on-state, the shape memory alloy line 610 contracts and hardens into a linear form, as shown in FIG. 5B, and the outer skin 314 is pressed inward and contracts. Because of this, the internal pressure of the main body frame 310 rises, and the exhaust valve 362 opens. As a result of this, internal air in the body 104 is discharged to the exterior (refer to a two-dot chain line arrow). At this time, the intake valve 352 maintains a closed state. As an outward appearance, the trunk portion of the robot 100 contracts to the original state, and the arm 106 takes on a lowered state. By the heretofore described operation being repeated, a state wherein the robot 100 outwardly appears to be breathing like a living creature can be realized. The intake valve 352, the exhaust valve 362, and the expansion and contraction drive mechanism 372 function as an "intake and exhaust mechanism".

Figure 6:
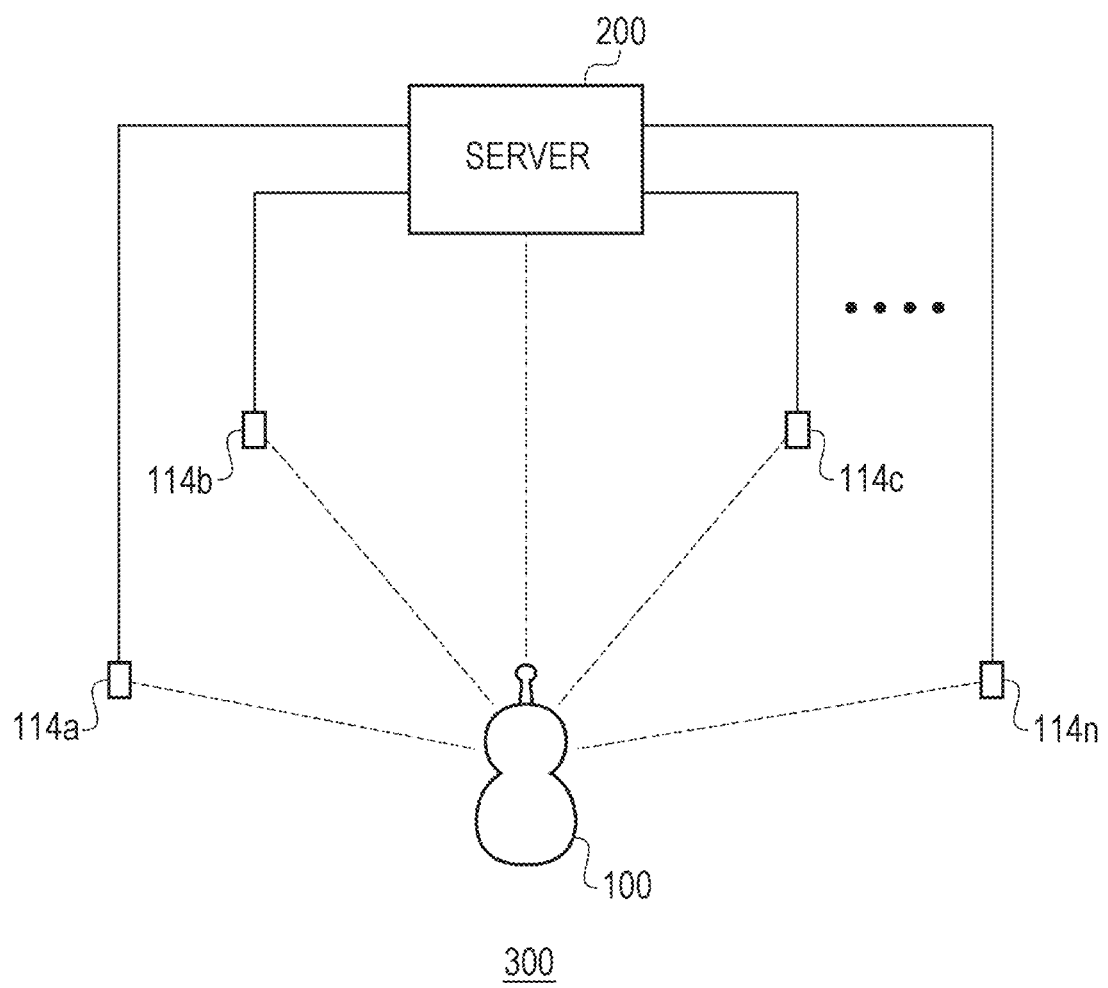
FIG. 6 is a configuration diagram of a robot system.

FIG. 6 is a configuration diagram of a robot system 300.

The robot system 300 includes the robot 100, the server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114. The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100. Of course, a method whereby the robot 100 regularly transmits its own positional coordinates to the server 200 may also be adopted.

Figure 7:
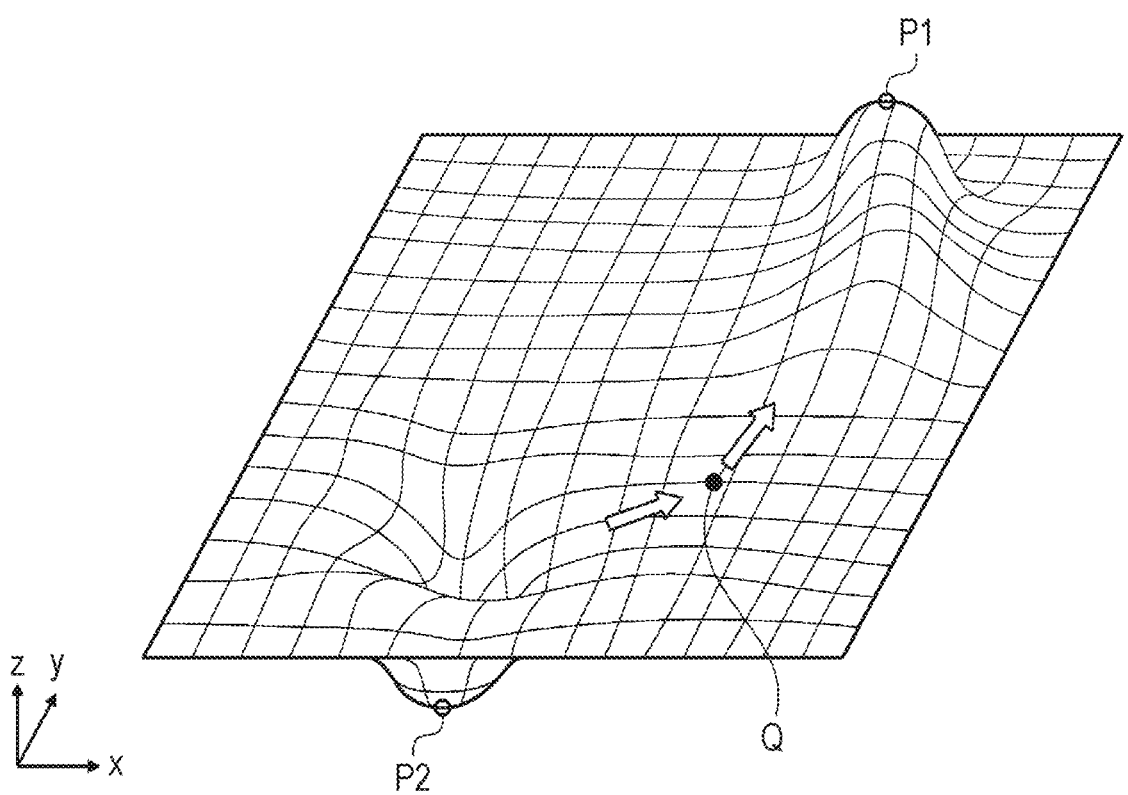
FIG. 7 is a schematic view of an emotion map.

FIG. 7 is a schematic view of an emotion map 116.

The emotion map 116 is a data table stored in the server 200. The robot 100 selects an action in accordance with the emotion map 116. The emotion map 116 shows a magnitude of an emotional attachment or aversion of the robot 100 to a place. An x axis and a y axis of the emotion map 116 indicate two-dimensional spatial coordinates. A z axis indicates a magnitude of an emotional attachment or aversion. When a z value is a positive value, an attachment to the place is high, and when the z value is a negative value, the robot 100 is averse to the place.

On the emotion map 116, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 has been gently stroked or touched in the past. A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like. A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the wheel (front wheel 102), thereby identifying the current position, or may identify the current position based on an image obtained from the camera. When the emotion map 116 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out an action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek security, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 8:
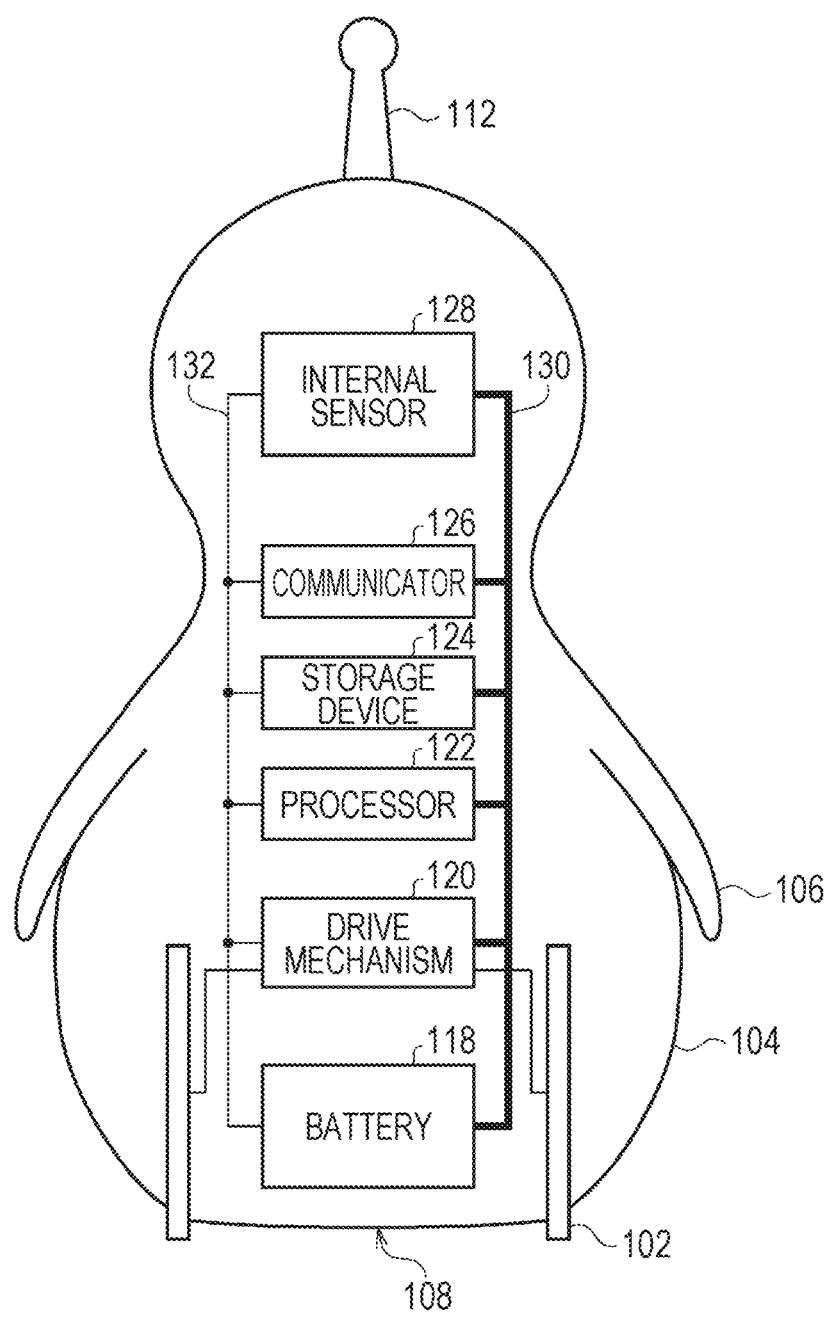
FIG. 8 is a hardware configuration diagram of the robot.

FIG. 8 is a hardware configuration diagram of the robot 100.

The robot 100 includes an internal sensor 128, a communicator 126, a storage device 124, a processor 122, a drive mechanism 120, and the battery 118. The units are connected to each other by a power line 130 and a signal line 132. The battery 118 supplies power to each unit via the power line 130. Each unit transmits and receives a control signal via the signal line 132. The battery 118 is a rechargeable battery such as a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection.

The drive mechanism 120 includes the wheel drive mechanism 370 and the expansion and contraction drive mechanism 372. The drive mechanism 120 mainly controls the wheels (front wheels 102), the head portion (the head portion frame 316), and the trunk portion (energization of the shape memory alloy line 610 that causes the expanding and contracting body to expand and contract). The drive mechanism 120 changes a direction of movement and a movement speed of the robot 100 by changing the rotational speed and the direction of rotation of each of the two front wheels 102. Also, the drive mechanism 120 can also raise and lower the wheels (the front wheels 102 and the rear wheel 103). When the wheels rise, the wheels are completely housed in the body 104, and the robot 100 comes into contact with the floor surface via the seating face 108, taking on the sitting state.

Figure 9:
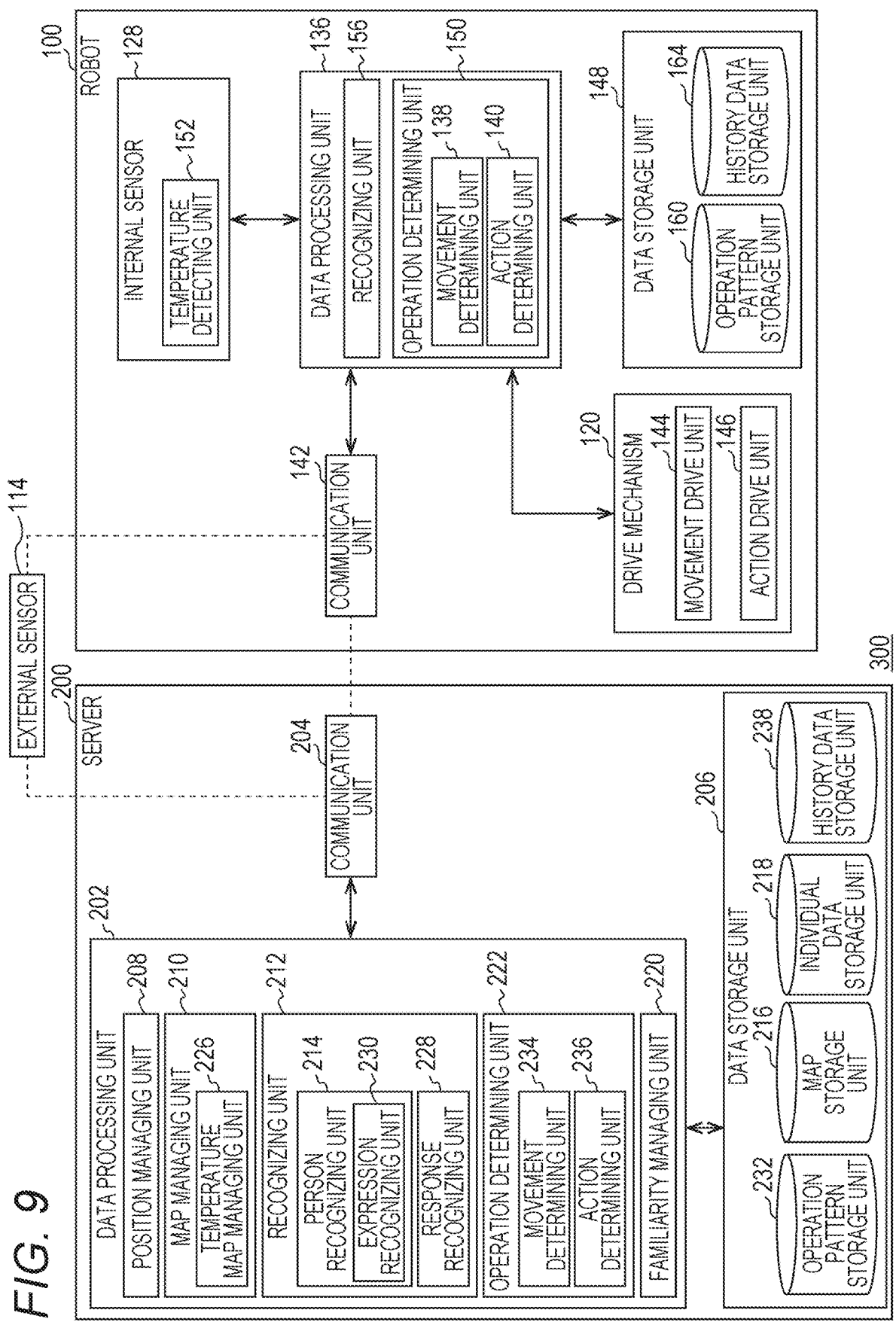
FIG. 9 is a functional block diagram of the robot system.

FIG. 9 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration. One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes an operation pattern storage unit 232, a map storage unit 216, an individual data storage unit 218, and a history data storage unit 238. The operation pattern storage unit 232 correlates ID (hereafter called "operation ID") of operation patterns representing various kinds of gesture of the robot 100 and selection conditions thereof. The map storage unit 216 stores a multiple of action maps. The individual data storage unit 218 stores information on a user, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender.

The history data storage unit 238 stores history information on movements, and actions (operations) such as gestures, of the robot 100. The history information includes information transmitted from the robot 100 in addition to information detected and managed on the server 200 side. The history information is regularly updated or deleted.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad. The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process load is large, but there is an advantage in that even a user who does not have a mobile device can be identified. One of the two methods may be employed alone, or user identification may be carried out using the two methods together in a complementary way. In this embodiment, users are clustered based on physical characteristics and behavioral characteristics, and a user is identified using deep learning (a multilayer neural network).

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation determining unit 222, and a familiarity managing unit 220. The position managing unit 208 identifies the positional coordinates of the robot 100 using the method described using FIG. 6. The position managing unit 208 may also track positional coordinates of a user in real time.

The map managing unit 210 changes the parameter of each coordinate on the multiple of action maps using the method described in connection with FIG. 7. A temperature map managing unit 226, which is one portion of functions of the map managing unit 210, manages a temperature map that is one kind of action map.

The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1. When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user. In addition to a person, the person recognizing unit 214 also, for example, extracts characteristics of a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response. Pleasant and unpleasant actions are distinguished depending on whether a responsive action of a user is pleasing or unpleasant for a living creature. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation determining unit 222 of the server 200 determines an operation (movement and gesture) of the robot 100 in cooperation with an operation determining unit 150 of the robot 100. The operation determining unit 222 includes a movement determining unit 234 and an action determining unit 236. The movement determining unit 234 compiles a movement target point of the robot 100, and a movement route for the movement target point, based on an action map selection by the map managing unit 210. The movement determining unit 234 compiles a multiple of movement routes, and having done so, may select any of the movement routes. The action determining unit 236 selects a gesture of the robot 100 from a multiple of operation patterns of the operation pattern storage unit 232.

The familiarity managing unit 220 manages familiarity for each user. As heretofore described, familiarity is registered as one portion of individual data in the individual data storage unit 218. Details of familiarity management will be described hereafter.

Robot 100

The robot 100 includes a communication unit 142, a data processing unit 136, a data storage unit 148, the drive mechanism 120, and the internal sensor 128. The communication unit 142 corresponds to the communicator 126 (refer to FIG. 8), and manages a process of communicating with the external sensor 114 and the server 200. The data storage unit 148 stores various kinds of data. The data storage unit 148 stores various kinds of data. The data storage unit 148 corresponds to the storage device 124 (refer to FIG. 8). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The internal sensor 128 includes a temperature detecting unit 152. The temperature detecting unit 152 measures a body temperature of a user and a peripheral temperature. The temperature detecting unit 152 includes a non-contact temperature sensor such as a radiation thermometer or thermography, and a contact temperature sensor such as a thermistor, a temperature measuring resistor, a thermocouple, or an IC temperature sensor.

The data storage unit 148 includes an operation pattern storage unit 160 and a history data storage unit 164. The operation pattern storage unit 160 defines various kinds of operation of the robot 100. Operation ID and an operation selection condition are correlated in the operation pattern storage unit 160. For example, a selection probability of an operation pattern A when an unpleasant action is detected is recorded correlated with the operation ID. An action determining unit 140 selects an operation pattern based on this kind of selection condition.

Operation ID, and a method of controlling various kinds of actuator for realizing the operation thereof, are defined in the operation pattern storage unit 160. Specifically, an operating timing, an operating time, an operating direction, and the like, of the various kinds of actuator (the drive mechanism 120) are defined chronologically in order to perform various gestures such as sitting by housing the wheels, raising the arm 106, causing the robot 100 to carryout a rotating action by causing the two front wheels 102 to rotate in reverse or by causing only one front wheel 102 to rotate, shaking by causing the front wheels 102 to rotate in a state in which the wheels are housed, or stopping once and looking back when moving away from a user.

The history data storage unit 164 sequentially stores history information on actions (operations) such as movements or gestures of the robot 100. The history information is transmitted to the server 200 at a timing of, for example, an ending process when turning off the power supply, or the like. The history data storage unit 164 is a volatile memory, and may be deleted by the power supply being turned off.

The data processing unit 136 includes a recognizing unit 156, and the operation determining unit 150. The operation determining unit 150 determines an operation of the robot 100 in cooperation with the operation determining unit 222 of the server 200. The operation determining unit 150 includes a movement determining unit 138 and the action determining unit 140. The operation determining unit 150 also functions as a "control unit" that controls the drive mechanism 120.

The drive mechanism 120 includes a movement drive unit 144 and an action drive unit 146. The movement determining unit 138 determines a direction of movement of the robot 100 together with the movement determining unit 234 of the server 200. Movement based on an action map may be determined by the server 200, and an immediate movement such as avoiding an obstacle may be determined by the movement determining unit 138. The movement drive unit 144 causes the robot 100 to head toward a movement target point by driving the wheels in accordance with an instruction from the movement determining unit 138. Although it is an action map that determines the main element of the direction of movement of the robot 100, the robot 100 can also carry out an action in accordance with familiarity.

Operation ID selected by the action determining unit 236 of the server 200 is transmitted to the robot 100, and the action determining unit 140 instructs the action drive unit 146 to execute the operation pattern corresponding to the operation ID.

One portion of complex operation patterns may be determined by the server 200, and other operation patterns may be determined by the robot 100. Alternatively, basic operation patterns may be determined by the server 200, and additional operation patterns may be determined by the robot 100. It is sufficient that the way an operation pattern determining process is divided between the server 200 and the robot 100 is designed in accordance with specifications of the robot system 300.

The action determining unit 140 can also execute a gesture of holding up both arms 106 as a gesture asking for "a hug" when a user with a high degree of familiarity is nearby, and can also execute a gesture of moving the arms 106 up and down. Also, the action determining unit 140 can also perform a gesture of no longer wanting to be hugged by causing the front wheels 102 to rotate in reverse in a housed state when bored of the "hug".

The action drive unit 146 causes the robot 100 to perform various gestures by driving each mechanism in accordance with an instruction from the action determining unit 140. For example, when receiving an instruction for a familiar operation from the action determining unit 140 when a user with a high degree of familiarity is nearby, the action drive unit 146 drives the wheel drive mechanism 370 to house the wheels, bringing about a state in which the robot 100 is sitting on the floor surface. Also, the action drive unit 146 raises the arm 106 by driving the expansion and contraction drive mechanism 372, causing the robot 100 to perform a gesture of asking for a hug.

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit). The recognizing unit 156 regularly films an exterior angle using the incorporated camera (the internal sensor 128), and detects a moving object such as a person or a pet. Characteristics thereof are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method. Also, temperature when touched can also be detected using the temperature detecting unit 152. The recognizing unit 156 also functions as a "temperature determining unit" that determines the temperature detected by the temperature detecting unit 152.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may be recognized as a violent action. When a user in a state of confronting the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the wheels decreasing. The recognizing unit 156 functions as a "lift and hug determining unit" that determines that the robot 100 has been lifted and hugged by a user.

In this way, the response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles. The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

Depending on how the robot 100 is treated by a moving object (user), familiarity toward the user changes. The familiarity managing unit 220 increases or reduces familiarity toward each clustered user. Familiarity mainly changes in accordance with (1) detection (visual recognition), (2) physical contact, and (3) speaking.

(1) Detection

When a small child is detected in an image filmed by the robot 100, the small child is "visually recognized" by the robot 100. More specifically, when it is determined that the characteristics of the detected moving object correspond with the cluster (profile) of the small child, using deep learning based on characteristic information obtained from the filmed image and other characteristic information obtained from the smell sensor and the like when filming, it is determined that there is visual recognition. When it is determined that there is visual recognition, the familiarity managing unit 220 increases the familiarity of the small child. The more frequently a user is detected, the more liable the familiarity is to increase. According to this kind of control method, the robot 100 emulates animal-like behavior in being more liable to feel a sense of closeness toward a person frequently met.

Not being limited to simple detection, familiarity may also increase when "eyes meet". The recognizing unit 156 of the robot 100 may recognize a facial image of a confronting user, recognize a line of sight from the facial image, and recognize that "eyes have met" when the time for which the line of sight is directed toward the robot 100 is a predetermined time or greater.

2. Physical Contact

When the robot 100 recognizes a user, and detects a touch (physical contact) from the user, it is determined that interest in the robot 100 has been shown by the user, and familiarity increases. For example, when the robot 100 is touched by the mother, the familiarity managing unit 220 increases the familiarity of the mother. The robot 100 may detect a touching of the robot 100 by an outer shell being covered with a piezoelectric fabric. Touching may also be detected by the body temperature of the user being detected by the temperature sensor. When the robot 100 detects a hug, familiarity may be considerably increased on the basis that strong affection toward the robot 100 has been shown.

Meanwhile, when the robot 100 detects a violent action such as being kicked, being hit, or having the horn 112 grasped, the familiarity managing unit 220 reduces familiarity. For example, when the robot 100 is thrown by the small child, the familiarity managing unit 220 considerably reduces familiarity with respect to the small child. According to this kind of control method, the robot 100 emulates animal-like behavior in being more liable to feel a sense of closeness toward a person who touches the robot 100 gently, but to dislike a violent person.

3. Speaking

Familiarity is also changed when the robot 100 detects speech directed toward the robot 100. For example, familiarity is increased when the robot 100 detects the name of the robot 100 or an affectionate term in a predetermined volume range. Typical terminological patterns such as "you're cute", "you're funny", or "come here" may be registered in advance as affectionate terms, and whether or not a term is an affectionate term determined using speech recognition. Meanwhile, familiarity may be reduced when the robot 100 is spoken to at a high volume exceeding a normal volume range. Familiarity is reduced when the robot 100 is scolded in a loud voice, or when surprised. Also, familiarity may be reduced when an abusive term is directed at the robot 100. Typical terminological patterns such as "stop it", "stay away", "get away", or "idiot" may be registered in advance as abusive terms, and whether or not a term is an abusive term determined using speech recognition.

The name of the robot 100 may be registered in advance by a user. Alternatively, the robot 100 may recognize a term used with particular frequency among various terms directed at the robot 100 as being the name of the robot 100. In this case, terms generally liable to be used frequently, such as "hey" and "come here", may be eliminated from candidates for name recognition.

According to the heretofore described control method, the robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The familiarity managing unit 220 reduces familiarity with the passing of time. For example, the familiarity managing unit 220 may reduce the familiarity of all users by 1 each every 10 minutes. When a user does not continue to be involved with the robot 100, or in other words, when a user does not continue to treat the robot 100 kindly, the user cannot maintain an intimate relationship with the robot 100.

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A cluster with extremely high familiarity

The robot 100 strongly expresses a feeling of affection by approaching a user (hereafter called an approaching action), and performing an affectionate gesture defined in advance as a gesture indicating goodwill toward a person.

(2) A cluster with comparatively high familiarity

The robot 100 carries out only an approaching action.

(3) A cluster with comparatively low familiarity

The robot 100 does not carry out any special action.

(4) A cluster with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity).

When detecting being lifted and hugged by the user A, the robot 100 can perform a gesture of not wanting to be hugged by increasing the speed of expansion and contraction by the expansion and contraction drive mechanism 372, or the like, thereby quickening a breathing expression, or by repeatedly starting and stopping rotation of the housed left and right front wheels 102 (the left wheel 102a and the right wheel 102b) in mutually different directions. At this time, the left and right front wheels 102 may be caused to simultaneously rotate in mutually opposite directions with respect to the axle (axial line). Also, the left and right front wheels 102 may be caused to rotate alternately. Meanwhile, when detecting being lifted and hugged by the user B, the robot 100 can express a feeling of security by reducing the speed of expansion and contraction by the expansion and contraction drive mechanism 372, or the like, thereby slowing down the breathing expression.

In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Wheel Housing Function

It is not envisaged that a general robot, despite being picked up for the sake of transportation, will be lifted and hugged by a user with affection. This is because however much the robot may be caused to perform animal-like behavior, the designer has a fixed idea that the robot is essentially a machine. With the robot 100, this fixed idea is eliminated, and design assuming that the robot 100 will be hugged by a user is carried out. The heretofore mentioned wheel housing function is one portion of the design.

When detecting that a user has approached in a stopped state, the robot 100 determines that a wheel housing condition is satisfied. Further, the wheel drive mechanism 370 is driven, and the wheels are raised to establish a non-contact state, and housed in the housing space S. The body 104 comes into contact with the ground in accompaniment to the wheel housing, whereby a gesture of the robot 100 sitting and waiting for a hug is performed. By moving the arm 106 in the way heretofore described, the robot 100 can also perform a gesture of asking for a hug.

As the wheels are almost completely housed in the body 104, a user is unlikely to be dirtied even when hugging the robot 100. That is, the wheels are dirty despite being used inside. When the dirty wheels come into contact with a user's clothing, the clothing is dirtied. The wheels are housed so that a user does not hesitate to hug due to concern that clothing will be dirtied. An emotion of the robot 100 can also be expressed by the wheels being driven so as to rotate in a housed state. For example, the robot 100 determines that a drive condition is satisfied when a user hugging the robot 100 is a user with low familiarity, and executes control such as causing the left and right wheels to rotate in mutually opposite directions, or alternately switching the directions of rotation. By so doing, the robot 100 can twist the body 104, thereby performing a gesture of not wanting to be hugged. By adding a neck shaking operation of the head portion frame 316 at this time, the robot 100 can emphasize the gesture of not wanting to be hugged. Conversely, the robot 100 determines that a drive condition is satisfied when a user hugging the robot 100 is a user with high familiarity, and may cause the wheels to rotate gently. By so doing, comfort of the robot 100 can also be expressed.

Breathing Function

A device that forcibly causes air to circulate, such as a fan, is mounted in a general robot. However, the robot 100, which emulates animal-like behavioral characteristics, is such that an operating noise of a fan will cause a user to feel that the robot 100 is a "machine", and is preferably restricted as far as possible. Therefore, the robot 100 of this embodiment is such that external air is taken into the body 104, and air in the interior is discharged, by driving the expansion and contraction drive mechanism 372, so that mechanical noise generated for cooling heat generating parts such as the CPU is reduced as far as possible. As heretofore described, the expanding and contracting operation of the robot 100 outwardly appears like the breathing of a living creature, because of which the robot 100 can be caused to seem nearer to a living creature (living being).

This kind of breathing expression changes in accordance with the internal state and peripheral environment of the robot 100. For example, after carrying out a frequent movement or other comparatively energetic operation, breathlessness after brisk exercise can be expressed by a breathing operation load being increased based on history information of the movement or operation. Also, an aspect of the robot 100 feeling the heat can be expressed by the breathing operation load being increased when detecting that the peripheral temperature is high owing to the season or air conditioning state. According to this kind of control, vitality of the robot 100 can be increased.

Figure 10:
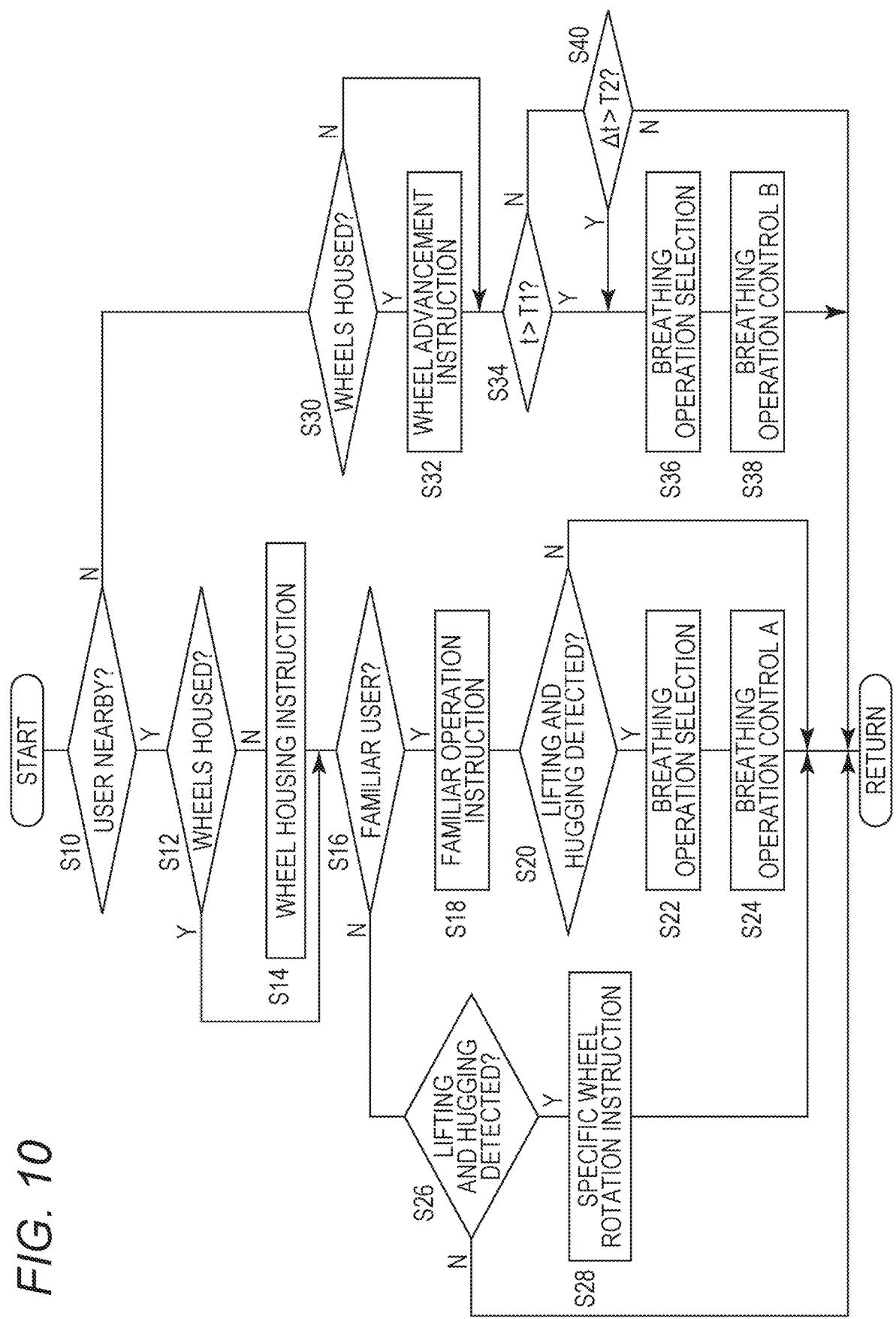
FIG. 10 is a flowchart showing an example of wheel drive control of the robot.

FIG. 10 is a flowchart showing an example of wheel drive control of the robot 100.

A process in the drawing is repeatedly executed in a predetermined control cycle. The internal sensor 128 regularly measures an internal temperature of the robot 100 and a room temperature (peripheral temperature). When it is detected by the recognizing unit 156 that a user is nearby (Y of S10), the action determining unit 140 issues an instruction for wheel housing to the action drive unit 146 (S14) when the wheels are not in a housed state (N of S12). Because of this, the wheels (the front wheels 102 and the rear wheel 103) are housed in the body 104, and the robot 100 takes on a state of sitting on the floor surface. When the wheels are already housed (Y of S12), the process of S14 is skipped.

When the approaching user at this time is a user with high familiarity (Y of S16), the action determining unit 140 issues an instruction for a familiar operation to the action drive unit 146 (S18). Because of this, the drive circuit 620 of the expansion and contraction drive mechanism 372 is turned on and off, and the arm 106 is shaken up and down, whereby a gesture of asking for a hug is performed.

Because of this, when the recognizing unit 156 recognizes being lifted and hugged by the user within a predetermined time (Y of S20), the action determining unit 140 selects a breathing operation (S22), and instructs the action drive unit 146 to carry out a breathing operation control A (S24). The breathing operation control A, for example, gently drives the expansion and contraction drive mechanism 372, thereby performing a breathing operation that emphasizes comfort. Meanwhile, when no lifting and hugging by the user B is detected (N of S20), the processes of S22 and S24 are skipped.

Meanwhile, when the approaching user is not a user with high familiarity (N of S16), the action determining unit 140 issues an instruction for a specific wheel rotation to the action drive unit 146 (S28) when the recognizing unit 156 recognizes being lifted and hugged by the user (Y of S26). Because of this, the left and right front wheels 102 are driven while still housed, whereby a gesture of not wanting a hug is performed. When being lifted and hugged by the user is not recognized (N of S26), the processes of S28 onward are skipped.

When no user being near is detected (N of S10), the action determining unit 140 issues an instruction for wheel advancement to the action drive unit 146 (S32) when the wheels are in a housed state (Y of S30). Because of this, the wheels advance out of the housing space S, and take on a movable state. When the wheels are not in a housed state (N of S30), the process of S32 is skipped.

When an internal temperature t at this time is greater than a predetermined threshold T1 (Y of S34), the action determining unit 140 selects a breathing operation (S36), and instructs the action drive unit 146 to carry out a breathing operation control B (S38). The breathing operation control B is set based on the internal temperature of the robot 100 and the peripheral temperature. For example, when it is determined based on the internal temperature and the peripheral temperature that a load of cooling to an appropriate temperature is large, cooling is promoted by the expansion and contraction drive mechanism 372 being driven at a comparatively high speed. When it is determined that the cooling load is small, cooling is promoted by the expansion and contraction drive mechanism 372 being driven at an appropriate speed. According to this kind of control, cooling efficiency is increased, and energy saving can be achieved.

Even when the internal temperature t is less than or equal to the threshold T1 (N of S34), the process shifts to S36 when a rate of change Δt of the internal temperature is greater than a predetermined threshold T2 (Y of S40). An internal temperature rate of change may be defined as a rate of temperature rise in a predetermined period, for example, every five seconds. This is because when the rate of temperature rise is high, it is predicted that cooling will soon become necessary even though the internal temperature t is low at the current point. When the internal temperature t is less than or equal to the threshold T1 (N of S34) and the rate of change Δt of the internal temperature is less than or equal to the threshold T2 (N of S40), the process is ended once.

Heretofore, the robot 100 and the robot system 300 including the robot 100 have been described based on an embodiment. In this embodiment, when the robot 100 confronts a user when stopped, the robot 100 houses the wheels, and performs a gesture of sitting and waiting for a hug. When hugged in response to this, a drive or otherwise of the housed wheels, or a drive aspect, is changed in accordance with the familiarity of the user, thereby expressing an emotion of the robot 100. According to this kind of function, the robot 100 can be given vitality, and an emotional sense of distance of a user with respect to the robot 100 can be reduced. Also, a configuration that is unlikely to dirty a user when the user hugs the robot 100 is realized by wheel housing, because of bodily contact of the user with 100 can be encouraged. That is, a physical sense of distance of a user with respect to the robot 100 can also be reduced.

Also, in this embodiment, the outer skin 314 of the body 104 is an expanding and contracting body, and an intake and discharge of air into and from the body 104 is carried out by an opening and closing of the intake valve 352 and the exhaust valve 362 in accordance with an expansion and contraction of the outer skin 314. Because of this, the heat generating parts inside the robot 100 can be cooled to an appropriate temperature, whereby failure, deterioration, and the like caused by heat can be prevented. Also, a breathing operation can be expressed by an expansion and contraction of the body 104, whereby the robot 100 can be given vitality.

That is, a problem such as stopping of the processor 122 or destruction of data in the memory (storage device 124) may also occur in the computer when the temperature is high. Noise increases when the operating level of a cooling function increases, particularly when lowering the internal temperature using a cooling device such as a fan. Noise when cooling causes the robot 100, which emulates animal-like behavioral characteristics, to seem like a "machine", which may reduce pleasure. At this point, in this embodiment, vitality can be provided by carrying out a supply and exhaust of air by causing the expansion and contraction mechanism to operate, which appears to be a breathing operation of the robot 100. Furthermore, the robot 100 has the characteristic of autonomous action. By the robot 100 moving of its own accord to a cool point C, cooling that does not depend excessively on a cooling device can be carried out. This kind of control method also contributes to energy saving in the robot 100.

Also, in this embodiment, clean external air can be introduced into the body 104 by the intake valve 354 being provided above the exhaust valve 364. Also, a situation wherein an unpleasant feeling is caused by high-temperature internal air that has been subjected to heat exchange being directed toward a user can be prevented.

Second Embodiment

Figure 11A:
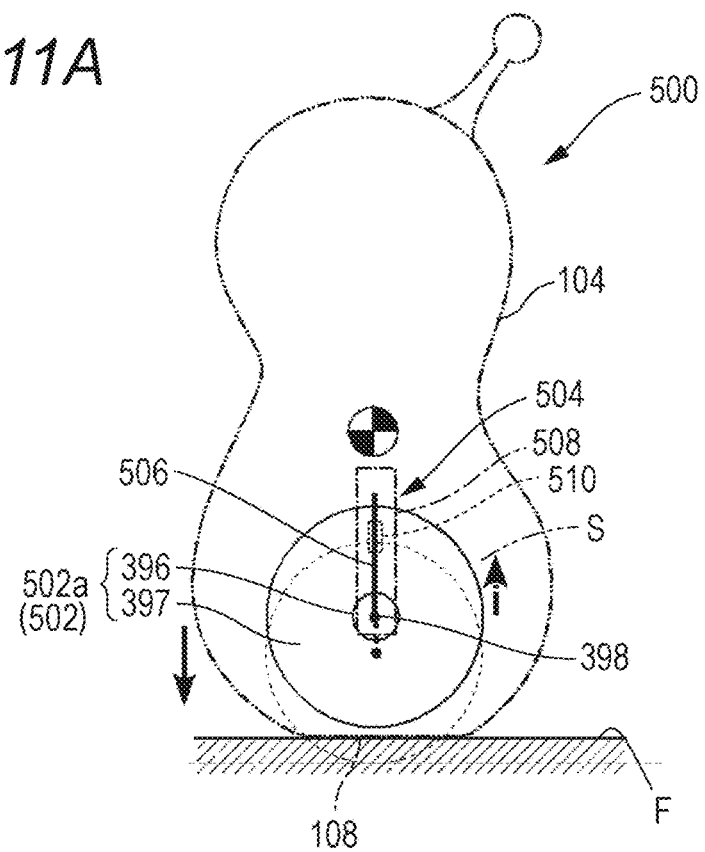
FIG. 11A and FIG. 11B are schematic views representing a configuration and an operation of a robot according to a second embodiment.
Figure 11B:
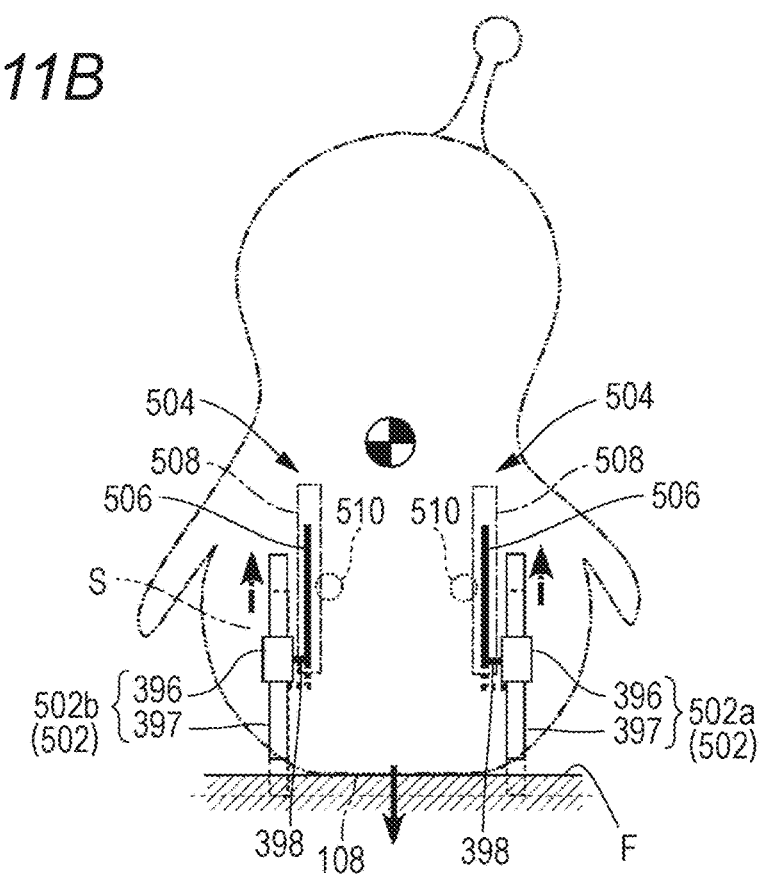

FIG. 11A and FIG. 11B are schematic views representing a configuration and an operation of a robot 500 according to a second embodiment. FIG. 11A is a side view, and FIG. 11B is a front view. Dotted lines in the drawing indicate a state wherein the wheels have advanced out of the housing space S and can run, and solid lines in the drawing indicate a state wherein the wheels are housed in the housing space S.

The robot 500 includes a pair of wheels 502 (a left wheel 502a and a right wheel 502b) for two-wheeled traveling, and a pair of drive mechanisms 504 for driving the wheels. The left wheel 502a and the right wheel 502b are drive wheels that can be individually controlled. The wheel 502 includes a DD motor 396 and a rim 397. An axle 398 of the wheel 502 is provided integrally with a pivot shaft 506 that extends in a vertical direction of the body 104. The pivot shaft 506 functions as a steering shaft of the wheel 502.

The drive mechanism 504 includes a steering mechanism 508 for steering the wheel 502, and an elevating mechanism 510 for raising and lowering the wheel 502. The steering mechanism 508 is an actuator that causes the pivot shaft 506 to pivot around an axial line thereof, and includes a motor and a speed reducer (reduction gear) omitted from the drawing. The elevating mechanism 510 is an actuator that raises the pivot shaft 506 toward the inside of the housing space S or lowers the pivot shaft 506 from the housing space S, and includes a rack and pinion mechanism omitted from the drawing.

The robot 500 is configured using a so-called inverted pendulum principle, and can maintain a posture and travel stably on two wheels. Various traveling states, such as advancing, reversing, turning right, turning left, rotating to the right, and rotating to the left, can be realized by adjusting a steering angle of each of the left wheel 502a and the right wheel 502b.

When housing the wheels, the pair of wheels 502 rise from the floor surface F (refer to a dashed-dotted arrow) owing to the elevating mechanism 510 being driven in one direction. Because of this, the body 104 descends, and the seating face 108 comes into contact with the floor surface F (refer to a solid arrow). Because of this, a state in which the robot 100 is sitting is realized. By the elevating mechanism 510 being driven in the opposite direction, each wheel is caused to advance out of the housing space S, whereby the robot 500 can be caused to stand.

The drive mechanism 504 is provided in an outer wall of the lower half portion 382 of the main body frame 310 (refer to FIG. 2), and a power line and a signal line are led into an interior of the main body frame 310 through a sealing member. Because of this, a sealing property of the communication channel 355 is secured.

Third Embodiment

FIG. 12A and FIG. 12B are drawings representing a configuration and an operation of a robot 600 according to a third embodiment. FIG. 12A indicates a state wherein the wheels (the front wheel 102 and the rear wheel 103) have advanced out of the housing space S and can run, and FIG. 12B indicates a state wherein the wheels are housed in the housing space S.

The robot 600 differs from the first embodiment in having a configuration such that the housing space S is closed together with the wheels being housed. An upper end portion of each of a pair of wheel covers 612 is coupled so as to be able to pivot to a trunk portion frame 618. That is, a pivot shaft 621 of the wheel cover 612 is pivotally supported by the trunk portion frame 618. An actuator 622 for driving the pivot shaft 621 so as to rotate is provided inside the trunk portion frame 618. The wheel cover 612 has a smooth form that curves from a base end having the pivot shaft 621 toward a leading end. The outer skin 314 is bonded along an outer face of the wheel cover 612.

Meanwhile, a fitting portion 619 with a depressed sectional form is provided in left and right side walls of a lower portion of the trunk portion frame 618. The fitting portion 619 is a fitting groove formed so as to oppose the wheel cover 612. A leading end portion of the wheel cover 612 fits detachably in the fitting portion 619. Also, a sensor 630 that can detect that the housing space S has been closed by the wheel cover 612 after wheel housing is provided in a vicinity of the fitting portion 619. The sensor 630 is a reflective photoelectric sensor, and emits light toward a side (lower) of the fitting portion 619. When the wheel cover 612 fits into the fitting portion 619, reflected light is detected by the sensor 630. It is determined from the detection of reflected light that the housing space S is closed.

As shown in FIG. 12A, the pair of wheel covers 612 are opened farthest in a state in which the robot 600 can run, and one portion of the wheels protrudes to the exterior from the housing space S. At this time, the wheel cover 612 is not positioned on an optical axis (refer to a two-dot chain line), because of which the sensor 630 is in an off-state. Meanwhile, when the actuator 622 is driven in one direction after wheel housing, the pair of wheel covers 612 operate in directions such as to reduce an interval between the two, and the leading ends thereof fit into the fitting portion 619, thereby closing the housing space S, as shown in FIG. 12B. At this time, the wheel cover 612 is positioned on the optical axis, because of which the sensor 630 is activated, and it is detected that the wheels are completely housed. When performing a gesture of not wanting to be hugged when the wheels are housed, the wheels are driven under a condition that the complete housing of the wheels is detected by the sensor 630.

When causing the wheels to advance in order to run, the actuator 622 is driven in the opposite direction. Because of this, the leading end portions of the pair of wheel covers 612 separate from the fitting portion 619, and operate in directions such as to increase the interval (FIG. 12A). Because of this, the housing space S is opened, and the wheels are in a state of being able to advance.

By the wheels being completely housed in a way such that the housing space S is closed by the wheel covers 612 in this way, the wheels can be reliably prevented from dirtying a user's clothing. Also, by the leading end of the wheel cover 612 being caused to fit into the frame (trunk portion frame 618), interference between a user's body and the wheels can be reliably prevented. Furthermore, the pair of wheel covers 612 are caused to operate inward together with wheel housing, whereby the body 104 transforms to a state of being more rounded overall, because of which an appearance of the robot 600 becomes softer. Because of these advantages, a user has no concern and naturally feels a desire to hug the robot 600, and physical and emotional senses of distance of the user with respect to the robot 600 can be reduced.

In this embodiment, a reflective photoelectric sensor is given as an example of a sensor that detects complete wheel housing, but a through-beam photoelectric sensor may also be employed. In this case, a light emitting element is provided on one side with respect to the fitting portion 619, a light receiving element is provided on another side, and it may be determined that the wheel cover 612 is fitted into the fitting portion 619, that is, that the housing space S is closed, when light from the light emitting element to the light receiving element is interrupted. Alternatively, the wheel cover 612 is detected by a magnetic sensor or other sensor, and it may be determined that the housing space S is closed. Also, it may be determined that the wheel cover 612 has been closed by a mechanical switch. That is, it is sufficient that the sensor 630 is configured so that the wheel cover 612 being closed can be detected using an arbitrary method such as non-contact or contact.

The invention not being limited to the heretofore described embodiments and modified examples, components can be modified and embodied without departing from the scope of the invention. Various inventions may be formed by appropriately combining a multiple of the components disclosed in the heretofore described embodiments and modified examples. Also, some components among all the components shown in the heretofore described embodiments and modified examples may be eliminated.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 9 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

A configuration such that the pair of arms 106 are displaced in accompaniment to an expanding or contracting transformation of the trunk portion is shown in the heretofore described embodiments. Ina modified example, a configuration may be such that the two arms 106 can also be individually controlled, and capable of simple operations such as raising, shaking, and oscillating. Specifically, a wire may be embedded in the arm 106. The arm 106 can be lifted by the drive mechanism 120 pulling the arm 106 via the wire. A gesture of shaking the arm can also be performed by causing the arm 106 to oscillate. A still more complex gesture can also be performed by utilizing a large number of wires.

A configuration such that the robot 100 is caused to carry out three-wheel traveling, the front wheels are drive wheels, and the rear wheel is a driven wheel, is shown as an example in the first embodiment. In a modified example, both the front wheels and the rear wheels may be drive wheels. Also, a configuration of one-wheel traveling or four-wheel traveling may be employed. In the latter case, either the front wheels or rear wheels may be drive wheels, or both may be drive wheels. It is preferable that all of the wheels can be housed in the body 104 using a drive mechanism.

An example wherein the intake port 354 is provided in an uppermost portion of the body 104 and the exhaust port 364 is provided in a lowermost portion is shown in the heretofore described embodiments, but it is sufficient that the intake port 354 is disposed higher relative to the exhaust port 364. Dispositions of the intake port 354 and the exhaust port 364 can be set as appropriate.

Although not mentioned in the heretofore described embodiments, the action determining unit 140 may determine an activity amount (operational amount) of the robot 100 based on the history information stored in the history data storage unit 164. Further, the greater the latest activity amount, the more cooling may be promoted by driving the expansion and contraction drive mechanism at a high speed, increasing drive frequency, or the like. As it is thought that a state in which the activity amount is large corresponds to a state in which the internal temperature of the robot 100 is high, the result is that cooling efficiency is increased. As an outward appearance, an aspect of breathing quickening after carrying out a vigorous operation can be expressed, whereby the vitality of the robot 100 can be further increased.

An example of valves that open and close autonomously by detecting a pressure difference between the inside and outside of the body is shown as the intake valve and the exhaust valve in the heretofore described embodiments. In a modified example, a configuration may be such that a valve body can approach or move away from an intake port or an exhaust port. Specifically, a valve structure having a valve body disposed opposing a valve seat so as to be able to come into contact with and separate from the valve seat, and a biasing member such as a spring that biases the valve body in a closing direction, may be employed. Furthermore, one or both of an intake valve and an exhaust valve may be an electrically driven valve such as an electromagnetic valve driven by a solenoid or an electric valve driven by a motor.

Although not mentioned in the heretofore described embodiments, an air pump may be installed inside the body, and a supply and exhaust of air carried out together with causing the expanding and contracting body to expand and contract.

In the heretofore described embodiments, the intake valve is disposed higher relative to the exhaust valve, but conversely, the intake valve may be disposed relatively lower. Note that the intake valve is preferably disposed in a position distanced from the floor surface.

In the heretofore described embodiments, the outer skin 314 (expanding and contracting body) is an elastic body. In a modified example, the outer skin 314 may be an expanding and contracting body having plasticity rather than being an elastic body. Further, a first drive mechanism that can push the expanding and contracting body out from an inside, and a second drive mechanism that can press the expanding and contracting body in from the outside, may be provided.

A configuration such that the robot has wheels as a "ground contacting portion (movement mechanism)" having a ground contacting surface when moving is shown as an example in the heretofore described embodiments. In a modified example, a configuration may be such that the "ground contacting portion" is a leg portion, and can walk. A drive mechanism drives the ground contacting portion so as to advance from a housing space provided in the body to the exterior and withdraw. A configuration such that the wheels are completely housed in the housing space of the body is shown as an example in the heretofore described embodiments. In a modified example, a configuration may be such that although a greater portion of the wheels is housed in the housing space, one portion of the wheels is exposed outside the body. That is, it is sufficient that when a housing condition is satisfied when stopped, a drive mechanism causes the ground contacting portion to withdraw into the housing space in a non-contact state. In this case, it is preferable that when the ground contacting portion is withdrawn into the housing space, a half or more of the ground contacting portion is housed. Because of this, dirtying of a user when lifting and hugging the robot, or the like, can be prevented or restricted.

Even when adopting a leg portion as the "ground contacting portion", a configuration may be such that a drive can be carried out with the leg portion in a state housed in the housing space. In this case, the leg portion may be driven forward and backward, in the same way as when walking. Alternatively, a configuration may be such that a pivot shaft is provided separately in the leg portion, and pivoting can be carried out only when in a housed state. Further, whether to drive or not, and a drive aspect, when the legs are housed may be caused to differ in accordance with whether or not a user hugging the robot is a user with high familiarity.

In the heretofore described examples, two conditions, those being the robot being in a stopped state and detection of a user being nearby, are given as examples of wheel (ground contacting portion) housing conditions. In a modified example, different conditions may be set as the housing conditions, or another condition may be added. For example, the user nearby being a user with high familiarity may be added to the conditions.

In the heretofore described examples, being lifted and hugged by a user whose familiarity is not high is given as an example of a condition for driving when the wheels (ground contacting portion) are housed. In a modified example, a different condition may be set as the drive condition, or another condition may be added. For example, familiarity may be divided into levels, and the user being a user with familiarity lower than a predetermined level may be adopted as a condition.

Although not mentioned in the heretofore described embodiments, the wheels in a housed state may be controlled as heretofore described when the robot is being hugged. For example, a gesture of not wanting to be hugged may be performed energetically by causing the wheels to stop suddenly from a rotating state. Conversely, twisting of the body stemming from the robot's pleasure may be performed by causing the wheels to stop slowly from a rotating state. Also, the robot may be caused to express a wish to change a hugging position by controlling a rotation or stopping, and the direction of rotation, of the left and right wheels. For example, the wheels may be controlled so as to obtain an inertial force causing the body to twist in a direction such that a face of a user can be seen by the robot. That is, the robot may be configured as a robot having a function of prompting a user so as to move the robot in a direction in which the robot wishes to move when being hugged (prompting the user to change a hugging state).

Also, even in the case of a user with high familiarity, the robot may perform a gesture of no longer wanting to be hugged when being hugged for a long time. That is, a time measuring unit that measures a continuous lifting and hugging time from a lifting and hugging determination being carried out may be provided. Further, when the continuous lifting and hugging time reaches a preset reference time, the movement mechanism (ground contacting portion/wheels) may be driven to perform a gesture of not wanting to be hugged.

In this case, the reference time may be set so as to differ in accordance with the familiarity of a user. The reference time may be longer the higher the familiarity, and the reference time may be shorter the lower the familiarity. Familiarity may be set in a multiple of stages, and a multiple of reference times may be set so as to correspond one with each stage. Alternatively, the reference time may be caused to differ in accordance with the season or the peripheral temperature. For example, a gesture of not wanting to be hugged at a hot time can be performed by the reference time being relatively short in summer (when the external temperature is high).

Although not mentioned in the heretofore described embodiments, a processing load of the CPU may be reduced in order to restrict a rise of the internal temperature in a state in which the robot is hugged. For example, an operation clock supplied to the CPU may be relatively slow. Also, the CPU may be caused to execute only a preset minimum necessary process.

Also, a drop determining unit that determines a dropping of the robot may be included. The drop determining unit, for example, includes an acceleration sensor, and a dropping may be determined based on a value of a detection by the acceleration sensor. When a dropping from a hugging state is determined, the wheels may be ejected, thereby absorbing shock when colliding with the floor surface. Tires formed of an elastic body may be attached to the rims of the wheels.

When a dropping from a hugging state is determined, the posture of the body may be balanced so that when the movement mechanism (the wheels and the like) is caused to advance out of the housing space to the exterior, the ground contacting surface of the movement mechanism comes into contact with the floor surface first. The robot may include a posture detecting unit in order to detect the posture of the robot while dropping. For example, the posture detecting unit may determine a gravitational force direction based on a result of a detection by an acceleration sensor, and detect the posture by detecting an amount of deviation between a vertical direction and each axial line of the robot. Alternatively, the posture detecting unit may detect the posture of the robot based on a peripheral image filmed by the camera. In this way, the posture detecting unit determines the current posture of the robot. Further, control causing the movement mechanisms (left and right wheels and the like) housed in the body to rotate in mutually opposite directions, alternately switching the directions of rotation, or suddenly stopping after rotation, is executed. By feedback control of wheel rotation being carried out in accordance with the posture of the robot in this way, the center of gravity of the dropping robot may be adjusted, and the posture balanced so that the movement mechanism is positioned downward in the gravitational force direction. The feedback control is such that control is executed to bring a deviation between a target value of the posture for positioning the movement mechanism downward in the gravitational force direction of the body and the detected value of the current posture close to zero. By so doing, damage to the body caused by dropping can be prevented or alleviated. In this example, the ground contacting surface of the movement mechanism is set as an approach point, and the posture is balanced so that the approach point comes into contact with the floor surface first. This is because the movement mechanism is designed to be strong. In another example, a structurally strong portion or a portion formed so as to absorb shock (a specific region) may be designed as the approach point when dropped, and the posture balanced so that the approach point comes into contact with the floor surface first. Also, in this example, the movement mechanism is driven so as to rotate in order to balance the posture of the robot. In another example, the posture may be balanced by also including a linear drive (translational drive) of the movement mechanism. For example, when the multiple of parts (left and right wheels, left and right leg portions, or the like) configuring the movement mechanism can be relatively displaced in a linear direction, the posture may be balanced by also including a linear drive of each part.

A lifting and hugging determination unit may determine stability of a hugging state. The stability may be determined based on one of a positional relationship with a user when the robot is being lifted and hugged, a contact region, a posture, or the like, or on a combination thereof. When performing a gesture of not wanting to be hugged using a drive of the internal mechanism, a drive aspect (drive magnitude (amplitude), speed, or the like) may be changed in accordance with the stability of the hugging state. For example, when it is determined that the hugging state is relatively stable, such as being supported with both hands on a user's knee, drive may be carried out relatively vigorously. When it is determined that the hugging state is relatively unstable, such as being supported by a user with one hand, drive is carried out relatively gently. Alternatively, drive may be prohibited. Stability of a hugging state may be divided into a multiple of levels, and a drive aspect caused to differ in accordance with the level.

In the heretofore described embodiments, a gesture of not wanting to be hugged is performed by a drive of the movement mechanism (ground contacting portion/wheels), but the gesture may be performed by driving a mechanism other than the movement mechanism. For example, the gesture may be performed by shaking the head portion sideways, waving the arm vigorously, or the like.

Although not mentioned in the heretofore described embodiments, housing of the movement mechanism (ground contacting portion/wheels) may be prohibited when the robot is suddenly lifted and hugged while moving. In this case, the drive system including the movement mechanism is preferably stopped immediately.

From an aspect of considering safety and the like of a user who lifts and hugs the robot, drive of the movement mechanism (ground contacting portion/wheels) may be locked when it is determined that the robot has been lifted and hugged. Also, drive of the movement mechanism may be locked when breaking of contact with the ground is detected, such as when the ground contacting surface of the movement mechanism (ground contacting portion/wheels) moves away from the floor surface, regardless of the cause of the lifting and hugging or the like. This kind of configuration may be applied regardless of whether or not the robot has a movement mechanism housing space.

This kind of autonomously acting robot can be defined in the following way. The robot includes a body, a movement mechanism having a ground contacting surface when moving, a drive mechanism that drives the movement mechanism, and an operation determining unit that determines a ground contacting state (a presence or otherwise of ground contact) of the ground contacting surface. The drive mechanism locks an operation of the movement mechanism when it is determined that the ground contacting surface is not in contact with the ground. A sensor (a touch sensor, a proximity sensor, or the like) for detecting the ground contacting state (a presence or otherwise of ground contact) of the ground contacting surface may be provided in the body or the movement mechanism. According to this kind of configuration, technical problems such as maintaining a sense of stability when a user lifts and hugs an autonomously acting robot, and ensuring safety at the time, can be resolved.

Although not mentioned in the heretofore described embodiments, feeling warmth emanating from the robot may be pleasant for a user depending on the season or the like. Therefore, a configuration may be such that heat is accumulated inside the body 104 by controlling so as to intentionally close both the intake valve and the exhaust valve while driving the robot. In this case, it is good when the intake valve and the exhaust valve are configured of an electrically driven valve such as an electromagnetic valve or an electric valve. By internal air warmed in this way being led to the inner surface of the outer skin 314 via the aperture portion 384, the outer skin 314 can be warmed from the inner side. A user can feel this warmth by lifting and hugging the robot in this state. This also leads to further increasing the vitality of the robot. A member with excellent heat conductivity may be embedded in the outer skin 314. Also, a through hole may be provided separately in a gap between the outer skin 314 and the main body frame 310 in a position differing from the aperture portion 384.

Although not mentioned in the heretofore described embodiments, a fan may be disposed in the communication channel 355 inside the trunk portion frame 318. By driving the fan, a difference in pressure between the inside and outside of the body 104 is created, and the intake valve 352 and the exhaust valve 362 can be opened simultaneously. Because of this, external air can be caused to circulate inside the body 104. The action determining unit 140 regulates a rotational speed of the fan in accordance with the internal temperature of the robot 100, and can regulate an operating level of the fan.

According to the heretofore described embodiments and modified examples, the robot can also be defined as an autonomously acting robot having the following configuration. The robot includes a hollow body having a head portion and a trunk portion, an intake port for taking external air into the body, an exhaust port for discharging internal air from the body, a communication channel that causes the intake port and the exhaust port to communicate and forms a sealed space when both the intake port and the exhaust port are closed, an expanding and contracting body disposed in the trunk portion and configuring at least one portion of the communication channel, a first drive mechanism for causing the expanding and contracting body to expand and contract, an intake and exhaust mechanism that opens the intake port with the exhaust port still closed in accordance with an expansion of the expanding and contracting body and opens the exhaust port with the intake port still closed in accordance with a contraction of the expanding and contracting body, a movement mechanism (ground contacting portion) having a ground contacting surface when moving, and a second drive mechanism that drives the movement mechanism so as to advance from a housing space provided in the body to an exterior and withdraw. The second drive mechanism causes the movement mechanism to withdraw into the housing space in a non-ground contacting state when a housing condition is satisfied when stopped.

A configuration may be such that at least one of the intake port and the exhaust port is an orifice or the like, and no valve is provided. In this case, the communication channel 355 is not sealed. This robot includes a hollow body having a head portion and a trunk portion, an intake port for taking external air into the body, an exhaust port for discharging internal air from the body, a communication channel that causes the intake port and the exhaust port to communicate, an expanding and contracting body disposed in the trunk portion and configuring at least one portion of the communication channel, a first drive mechanism for causing the expanding and contracting body to expand and contract, an intake and exhaust mechanism that increases an aperture of the intake port to be greater than that of the exhaust port in accordance with an expansion of the expanding and contracting body and increases an aperture of the exhaust port to be greater than that of the intake port in accordance with a contraction of the expanding and contracting body, a movement mechanism (ground contacting portion) having a ground contacting surface when moving, and a second drive mechanism that drives the movement mechanism so as to advance from a housing space provided in the body to an exterior and withdraw. The second drive mechanism causes the movement mechanism to withdraw into the housing space in a non-ground contacting state when a housing condition is satisfied when stopped. With this kind of configuration too, a change in capacity of the expanding and contracting body can be realized by balancing the apertures of the intake port and the exhaust port. Because of this, a sense that the robot is breathing can be evoked.

Although not mentioned in the heretofore described embodiments, the internal temperature rises in a state in which the robot is hugged, and when the internal temperature exceeds a preset determination reference value, or when it is determined that the internal temperature will exceed the determination reference a predetermined time later, the robot may be caused to perform an operation of not wanting to be hugged. In the latter case, for example, it may be determined (estimated) whether or not the internal temperature will reach the determination reference based on the current internal temperature and a temperature rise gradient. For example, a control such as causing the left and right wheels housed in the body to rotate in mutually opposite directions, or alternately switching the directions of rotation, is executed. That is, a user is prompted to lower the robot to the floor surface by carrying out an operation that causes the robot to feel difficult to hug. Control may be such that when the user lowers the robot to the floor surface, the robot moves away from the user, and carries out cooling of the internal heat generating parts. When a cooling fan is disposed in the robot, cooling may be carried out by driving the fan. By so doing, a reduction in pleasure due to the user hearing the noise of the cooling fan rotating, and being aware that the robot is a machine, can be prevented, and thermal runaway, failure of a heat generating part, or the like, caused by heat generation can be prevented.

What is claimed is:

1. An autonomously acting robot, comprising:
   a body;
   a movement mechanism having a surface configured to contact a floor supporting the body during movement;
   a sensor configured to detect a state of at least one of an interior of the autonomously acting robot or an exterior surrounding the autonomously acting robot;
   a processor configured to execute instructions for determining whether a housing condition is satisfied based on the detected state, wherein the processor is configured to determine that the housing condition is satisfied in response to a user being detected to be within a predetermined proximity to the sensor; and
   a drive mechanism configured to cause the movement mechanism to withdraw into the body in response to the housing condition being satisfied, wherein the withdrawn movement mechanism is in a non-contact state with the floor.

2. The autonomously acting robot according to claim 1, wherein the movement mechanism comprises a wheel.

3. The autonomously acting robot according to claim 1, wherein the processor is further configured to execute the instructions for determining whether a drive condition is satisfied based on the detected state, wherein
the drive mechanism is configured to activate the movement mechanism in response to the drive condition being satisfied and the movement mechanism being in the body.

4. The autonomously acting robot according to claim 3, wherein the processor is further configured to execute the instructions for determining whether the robot has been lifted or hugged, wherein
the drive mechanism is configured to activate the movement mechanism in response to a determination that the robot has been lifted or hugged and the drive condition is satisfied.

5. The autonomously acting robot according to claim 1, wherein the body comprises a bottom face that is configured to contact the floor during the movement mechanism being in the body.

6. The autonomously acting robot according to claim 4, wherein the processor is further configured to execute the instructions for:
recognizing a responsive action of a user;
updating a familiarity with respect to the user in accordance with the recognized responsive action.

7. The autonomously acting robot according to claim 6, wherein the drive mechanism, in response to a determination that the robot has been lifted or hugged and the movement mechanism is in the body, is configured to activate the movement mechanism based on the familiarity of the user.

8. The autonomously acting robot according to claim 4, further comprising a cover configured to open and close in response to movement of the movement mechanism into and out of the body,
wherein the cover being closed satisfies the drive condition.

9. The autonomously acting robot according to claim 1, wherein the processor is further configured to execute the instructions for:
determining whether the autonomously acting robot is dropping,
detecting a posture of the robot during the dropping, and
setting a specific region of the robot as an approach point.

10. The autonomously acting robot according to claim 9, wherein the drive mechanism, based on the detected posture detected, is configured to activate the movement mechanism so that the approach point contacts the ground first in response to determining the autonomously acting robot is dropped.

11. The autonomously acting robot according to claim 1, wherein the processor is further configured to execute the instructions for determining whether the autonomously acting robot is dropping, wherein
the drive mechanism is configured to activate the movement mechanism to be outside the body in response to the determination that the autonomously acting robot is dropping and the movement mechanism being within the body.

12. The autonomously acting robot according to claim 1, further comprising a cover configured to close in response to the movement mechanism being inside the body.

13. An autonomously acting robot, comprising:
a body;
a sensor configured to detect a state of at least one of an interior of the autonomously acting robot or an exterior surrounding the autonomously acting robot;
a processor configured to execute instructions for:
determining whether the autonomously acting robot is dropping;
detecting the posture of the robot during the dropping; and
setting a specific region of the robot as an approach point; and
a drive mechanism configured to activate a movement mechanism to be outside the body in response to the determination that the autonomously acting robot is dropping and the movement mechanism being within the body.

14. The autonomously acting robot according to claim 13, further comprising a drive mechanism configured to adjust a posture of the body based on the detected posture detected, so that the approach point contacts the ground first in response to determining the autonomously acting robot is dropped.

15. The autonomously acting robot according to claim 13, further comprising a cover configured to close in response to a movement mechanism being inside the body.

16. An autonomously acting robot, comprising:
a body;
a processor configured to execute instructions for:
determining whether the autonomously acting robot is dropping,
detecting a posture of the robot during the dropping, and
setting a specific region of the robot as an approach point; and
a drive mechanism configured to activate a movement mechanism to be outside the body in response to the determination that the autonomously acting robot is dropping and the movement mechanism being within the body.

17. The autonomously acting robot according to claim 16, wherein the drive mechanism, based on the detected posture detected, is configured to adjust the posture so that the approach point contacts the ground first in response to determining the autonomously acting robot is dropping.

* * * * *